United States Patent
Neumeier et al.

(10) Patent No.: US 11,659,255 B2
(45) Date of Patent: May 23, 2023

(54) DETECTION OF COMMON MEDIA SEGMENTS

(71) Applicant: INSCAPE DATA, INC., Irvine, CA (US)

(72) Inventors: Zeev Neumeier, Berkeley, CA (US); Michael Collette, San Rafael, CA (US)

(73) Assignee: INSCAPE DATA, INC., Irvine, CA (US)

( * ) Notice: Subject to any disclaimer, the term of this patent is extended or adjusted under 35 U.S.C. 154(b) by 172 days.

(21) Appl. No.: 17/099,964

(22) Filed: Nov. 17, 2020

(65) Prior Publication Data
US 2021/0144450 A1    May 13, 2021

Related U.S. Application Data

(63) Continuation of application No. 16/444,152, filed on Jun. 18, 2019, now Pat. No. 10,873,788, which is a
(Continued)

(51) Int. Cl.
*H04N 7/10*        (2006.01)
*H04N 21/81*       (2011.01)
(Continued)

(52) U.S. Cl.
CPC ... *H04N 21/8126* (2013.01); *H04N 21/23418* (2013.01); *H04N 21/25866* (2013.01);
(Continued)

(58) Field of Classification Search
CPC ......... H04N 21/8126; H04N 21/23418; H04N 21/25866; H04N 21/26283;
(Continued)

(56) References Cited

U.S. PATENT DOCUMENTS

| 4,677,466 A | 6/1987 | Lert, Jr. et al. |
| 4,697,209 A | 9/1987 | Kiewit et al. |

(Continued)

FOREIGN PATENT DOCUMENTS

| CA | 2501316 | 9/2005 |
| CN | 1557096 | 12/2004 |

(Continued)

OTHER PUBLICATIONS

International Search Report and Written Opinion dated Mar. 31, 2015 for PCT Application No. PCT/US2014/072255, 8 pages.
(Continued)

*Primary Examiner* — Jefferey F Harold
*Assistant Examiner* — Sahar Aqil Riaz
(74) *Attorney, Agent, or Firm* — Polsinelli LLP

(57) ABSTRACT

Provided are systems, methods, and computer-program products for identifying a media content stream when the media content stream is playing an unscheduled media segment. A computing device may receive a plurality of media content streams, where at least two of the plurality of media content streams concurrently includes a same unscheduled media segment. The computing device may determine that the media display device is playing the unscheduled media segment by examining the media content available at the current time in each of the plurality of media content streams. The computing device may determine identification information from the media content included in the media content stream. The computing device may determine contextually-related content, which may be disabled while the unscheduled media segment is being played by the media display device. The computing device may display the media content stream and the contextually-related content after the unscheduled media segment has been played.

20 Claims, 16 Drawing Sheets

Related U.S. Application Data continuation of application No. 15/211,345, filed on Jul. 15, 2016, now Pat. No. 10,375,451.

(60) Provisional application No. 62/193,322, filed on Jul. 16, 2015.

(51) Int. Cl.

| | | |
|---|---|---|
| *H04N 21/234* | (2011.01) | |
| *H04N 21/258* | (2011.01) | |
| *H04N 21/262* | (2011.01) | |
| *H04N 21/2668* | (2011.01) | |
| *H04N 21/45* | (2011.01) | |
| *H04N 21/462* | (2011.01) | |
| *H04N 21/84* | (2011.01) | |
| *H04N 21/845* | (2011.01) | |

(52) U.S. Cl.
CPC ... *H04N 21/2668* (2013.01); *H04N 21/26283* (2013.01); *H04N 21/4532* (2013.01); *H04N 21/462* (2013.01); *H04N 21/812* (2013.01); *H04N 21/84* (2013.01); *H04N 21/8456* (2013.01); *H04N 21/2625* (2013.01)

(58) Field of Classification Search
CPC ........... H04N 21/2668; H04N 21/4532; H04N 21/462; H04N 21/812; H04N 21/84; H04N 21/8456; H04N 21/2625; H04N 21/454
USPC .......................................................... 725/32
See application file for complete search history.

(56) References Cited

U.S. PATENT DOCUMENTS

| | | | |
|---|---|---|---|
| 4,739,398 | A | 4/1988 | Thomas et al. |
| 5,019,899 | A | 5/1991 | Boles et al. |
| 5,193,001 | A | 3/1993 | Kerdranvrat |
| 5,210,820 | A | 5/1993 | Kenyon |
| 5,319,453 | A | 6/1994 | Copriviza et al. |
| 5,436,653 | A | 7/1995 | Ellis et al. |
| 5,473,607 | A | 12/1995 | Hausman |
| 5,481,294 | A | 1/1996 | Thomas et al. |
| 5,557,334 | A | 9/1996 | Legate |
| 5,572,246 | A | 11/1996 | Ellis et al. |
| 5,650,828 | A * | 7/1997 | Lee ..................... H04N 5/208 348/625 |
| 5,812,286 | A | 9/1998 | Li |
| 5,826,165 | A | 10/1998 | Echeita et al. |
| 5,918,223 | A | 6/1999 | Blum et al. |
| 6,008,802 | A | 12/1999 | Goldschmidt et al. |
| 6,025,837 | A | 2/2000 | Matthews, III et al. |
| 6,035,177 | A | 3/2000 | Moses et al. |
| 6,064,764 | A | 5/2000 | Bhaskaran et al. |
| 6,298,482 | B1 | 10/2001 | Seidman |
| 6,381,362 | B1 | 4/2002 | Deshpande et al. |
| 6,415,438 | B1 | 7/2002 | Blackketter et al. |
| 6,463,585 | B1 | 10/2002 | Hendricks et al. |
| 6,469,749 | B1 | 10/2002 | Dimitrova |
| 6,577,346 | B1 | 6/2003 | Perlman |
| 6,577,405 | B2 | 6/2003 | Kranz et al. |
| 6,628,801 | B2 | 9/2003 | Powell et al. |
| 6,647,548 | B1 | 11/2003 | Lu et al. |
| 6,675,174 | B1 | 1/2004 | Bolle et al. |
| 6,771,316 | B1 | 8/2004 | Iggulden |
| 6,804,659 | B1 | 10/2004 | Graham et al. |
| 6,978,470 | B2 | 12/2005 | Swix et al. |
| 6,990,453 | B2 | 1/2006 | Wang et al. |
| 7,028,327 | B1 | 4/2006 | Dougherty et al. |
| 7,039,930 | B1 | 5/2006 | Goodman et al. |
| 7,050,068 | B1 | 5/2006 | Bastos et al. |
| 7,051,351 | B2 | 5/2006 | Goldman et al. |
| 7,064,796 | B2 | 6/2006 | Roy et al. |
| 7,089,575 | B2 | 8/2006 | Agnihotri et al. |
| 7,098,959 | B2 | 8/2006 | Mishima et al. |
| 7,136,875 | B2 | 11/2006 | Anderson et al. |
| 7,178,106 | B2 | 2/2007 | Lamkin et al. |
| 7,210,157 | B2 | 4/2007 | Devara |
| 7,243,239 | B2 | 7/2007 | Kirovski |
| 7,325,013 | B2 | 1/2008 | Camso |
| 7,346,512 | B2 | 3/2008 | Wang et al. |
| 7,356,830 | B1 | 4/2008 | Dimitrova |
| 7,421,723 | B2 | 9/2008 | Harkness et al. |
| 7,545,984 | B1 | 6/2009 | Kiel et al. |
| 7,590,998 | B2 | 9/2009 | Hanley |
| 7,623,823 | B2 | 11/2009 | Zito et al. |
| 7,787,696 | B2 | 8/2010 | Wilhelm et al. |
| 7,793,318 | B2 | 9/2010 | Deng |
| 7,933,451 | B2 | 4/2011 | Kloer |
| 7,991,764 | B2 | 8/2011 | Rathod |
| 8,001,571 | B1 | 8/2011 | Schwartz et al. |
| 8,094,872 | B1 | 1/2012 | Yagnik et al. |
| 8,171,004 | B1 | 5/2012 | Kaminski, Jr. et al. |
| 8,171,030 | B2 | 5/2012 | Peira et al. |
| 8,175,413 | B1 | 5/2012 | Ioffe et al. |
| 8,189,945 | B2 | 5/2012 | Stojancic et al. |
| 8,195,589 | B2 | 6/2012 | Bakke et al. |
| 8,195,689 | B2 | 6/2012 | Ramanathan et al. |
| 8,229,227 | B2 | 7/2012 | Stojancic et al. |
| 8,335,786 | B2 | 12/2012 | Peira et al. |
| 8,352,535 | B2 | 1/2013 | Peled |
| 8,364,703 | B2 | 1/2013 | Ramanathan et al. |
| 8,385,644 | B2 | 2/2013 | Stojancic et al. |
| 8,392,789 | B2 | 3/2013 | Biscondi et al. |
| 8,477,232 | B2 * | 7/2013 | Forutanpour ........... G06T 7/564 348/625 |
| 8,494,234 | B1 | 7/2013 | Djordjevic et al. |
| 8,522,283 | B2 | 8/2013 | Laligand et al. |
| 8,595,781 | B2 | 11/2013 | Neumeier et al. |
| 8,619,877 | B2 | 12/2013 | McDowell |
| 8,625,902 | B2 | 1/2014 | Baheti et al. |
| 8,769,854 | B1 | 7/2014 | Battaglia |
| 8,776,105 | B2 | 7/2014 | Sinha et al. |
| 8,788,328 | B1 | 7/2014 | George |
| 8,832,723 | B2 | 9/2014 | Sinha et al. |
| 8,856,817 | B2 | 10/2014 | Sinha et al. |
| 8,893,167 | B2 | 11/2014 | Sinha et al. |
| 8,893,168 | B2 | 11/2014 | Sinha et al. |
| 8,898,714 | B2 | 11/2014 | Neumeier et al. |
| 8,918,804 | B2 | 12/2014 | Sinha et al. |
| 8,918,832 | B2 | 12/2014 | Sinha et al. |
| 8,930,980 | B2 | 1/2015 | Neumeier et al. |
| 8,953,891 | B1 * | 2/2015 | Hundemer ........... H04N 21/812 386/250 |
| 8,959,202 | B2 | 2/2015 | Haitsma et al. |
| 9,055,309 | B2 | 6/2015 | Neumeier et al. |
| 9,055,335 | B2 | 6/2015 | Neumeier et al. |
| 9,071,868 | B2 | 6/2015 | Neumeier et al. |
| 9,083,710 | B1 | 7/2015 | Yadav |
| 9,094,714 | B2 | 7/2015 | Neumeier et al. |
| 9,094,715 | B2 | 7/2015 | Neumeier et al. |
| 9,262,671 | B2 | 2/2016 | Unzueta |
| 9,368,021 | B2 | 6/2016 | Touloumtzis |
| 9,432,616 | B1 | 8/2016 | Hurd |
| 9,449,090 | B2 | 9/2016 | Neumeier et al. |
| 9,465,867 | B2 | 10/2016 | Hoarty |
| 9,484,065 | B2 | 11/2016 | McDowell |
| 9,756,283 | B1 * | 9/2017 | Hundemer ....... H04N 21/23418 |
| 9,838,753 | B2 | 12/2017 | Neumeier et al. |
| 9,955,192 | B2 | 4/2018 | Neumeier et al. |
| 10,080,062 | B2 | 9/2018 | Neumeier et al. |
| 10,116,972 | B2 | 10/2018 | Neumeier et al. |
| 10,169,455 | B2 | 1/2019 | Neumeier et al. |
| 10,185,768 | B2 | 1/2019 | Neumeier et al. |
| 10,192,138 | B2 | 1/2019 | Neumeier et al. |
| 10,271,098 | B2 | 4/2019 | Neumeier et al. |
| 10,284,884 | B2 | 5/2019 | Neumeier et al. |
| 10,306,274 | B2 | 5/2019 | Neumeier et al. |
| 10,375,451 | B2 | 8/2019 | Neumeier et al. |
| 10,405,014 | B2 | 9/2019 | Neumeier et al. |
| 10,482,349 | B2 | 11/2019 | Neumeier |
| 10,674,223 | B2 | 6/2020 | Neumeier et al. |

(56) References Cited

U.S. PATENT DOCUMENTS

| | | |
|---|---|---|
| 10,820,048 B2 | 10/2020 | Neumeier et al. |
| 2001/0039658 A1 | 11/2001 | Walton |
| 2001/0044992 A1 | 11/2001 | Jahrling |
| 2002/0026635 A1 | 2/2002 | Wheeler et al. |
| 2002/0054069 A1 | 5/2002 | Britt et al. |
| 2002/0054695 A1 | 5/2002 | Bjorn et al. |
| 2002/0056088 A1 | 5/2002 | Silva, Jr. et al. |
| 2002/0059633 A1 | 5/2002 | Harkness et al. |
| 2002/0078144 A1 | 6/2002 | Lamkin et al. |
| 2002/0083060 A1 | 6/2002 | Wang et al. |
| 2002/0083442 A1 | 6/2002 | Eldering |
| 2002/0100041 A1 | 7/2002 | Rosenberg et al. |
| 2002/0105907 A1 | 8/2002 | Bruekers et al. |
| 2002/0120925 A1 | 8/2002 | Logan |
| 2002/0122042 A1 | 9/2002 | Bates |
| 2002/0144262 A1 | 10/2002 | Plotnick |
| 2002/0162117 A1 | 10/2002 | Pearson et al. |
| 2002/0162118 A1 | 10/2002 | Levy et al. |
| 2003/0026422 A1 | 2/2003 | Gerheim et al. |
| 2003/0086341 A1 | 5/2003 | Wells |
| 2003/0105794 A1* | 6/2003 | Jasinschi ............ H04N 21/4882 718/1 |
| 2003/0118243 A1 | 6/2003 | Sezer |
| 2003/0121037 A1 | 6/2003 | Swix et al. |
| 2003/0121046 A1 | 6/2003 | Roy et al. |
| 2003/0147561 A1 | 8/2003 | Faibish |
| 2003/0182291 A1 | 9/2003 | Kurupati |
| 2003/0188321 A1 | 10/2003 | Shoff et al. |
| 2003/0208763 A1 | 11/2003 | McElhatten et al. |
| 2004/0045020 A1 | 3/2004 | Witt et al. |
| 2004/0059708 A1 | 3/2004 | Dean et al. |
| 2004/0183825 A1 | 9/2004 | Stauder et al. |
| 2004/0216171 A1 | 10/2004 | Barone et al. |
| 2004/0221237 A1 | 11/2004 | Foote et al. |
| 2004/0226035 A1 | 11/2004 | Hauser |
| 2004/0237102 A1 | 11/2004 | Konig |
| 2004/0240562 A1 | 12/2004 | Bargeron et al. |
| 2005/0015795 A1 | 1/2005 | Iggulden |
| 2005/0015796 A1 | 1/2005 | Bruckner et al. |
| 2005/0027766 A1 | 2/2005 | Ben |
| 2005/0066352 A1 | 3/2005 | Herley |
| 2005/0120372 A1 | 6/2005 | Itakura |
| 2005/0149968 A1 | 7/2005 | Konig et al. |
| 2005/0172312 A1 | 8/2005 | Lienhart et al. |
| 2005/0207416 A1 | 9/2005 | Rajkotia |
| 2005/0209065 A1 | 9/2005 | Schlosser et al. |
| 2005/0235318 A1 | 10/2005 | Grauch et al. |
| 2006/0029286 A1 | 2/2006 | Lim et al. |
| 2006/0029368 A1 | 2/2006 | Harville |
| 2006/0031914 A1 | 2/2006 | Dakss et al. |
| 2006/0116989 A1 | 6/2006 | Bellannkonda |
| 2006/0120624 A1 | 6/2006 | Jojic |
| 2006/0133647 A1 | 6/2006 | Werner et al. |
| 2006/0153296 A1 | 7/2006 | Deng |
| 2006/0155952 A1 | 7/2006 | Haas |
| 2006/0173831 A1 | 8/2006 | Basso et al. |
| 2006/0187358 A1 | 8/2006 | Lienhart et al. |
| 2006/0193506 A1 | 8/2006 | Dorphan et al. |
| 2006/0195857 A1 | 8/2006 | Wheeler et al. |
| 2006/0195860 A1 | 8/2006 | Eldering et al. |
| 2006/0245724 A1 | 11/2006 | Hwang et al. |
| 2006/0245725 A1 | 11/2006 | Lim |
| 2006/0253330 A1 | 11/2006 | Maggio et al. |
| 2006/0277047 A1 | 12/2006 | DeBusk et al. |
| 2006/0294561 A1 | 12/2006 | Grannan et al. |
| 2007/0009235 A1 | 1/2007 | Walters et al. |
| 2007/0033608 A1 | 2/2007 | Eigeldinger |
| 2007/0050832 A1 | 3/2007 | Wright et al. |
| 2007/0061724 A1 | 3/2007 | Slothouber et al. |
| 2007/0061831 A1 | 3/2007 | Savoor et al. |
| 2007/0083901 A1 | 4/2007 | Bond |
| 2007/0094696 A1 | 4/2007 | Sakai |
| 2007/0109449 A1 | 5/2007 | Cheung |
| 2007/0113263 A1 | 5/2007 | Chatani |
| 2007/0124762 A1 | 5/2007 | Chickering et al. |
| 2007/0139563 A1 | 6/2007 | Zhong |
| 2007/0143796 A1 | 6/2007 | Malik |
| 2007/0168409 A1 | 7/2007 | Cheung |
| 2007/0180459 A1 | 8/2007 | Smithpeters et al. |
| 2007/0192782 A1 | 8/2007 | Ramaswamy |
| 2007/0242880 A1 | 10/2007 | Stebbings |
| 2007/0250901 A1 | 10/2007 | McIntire et al. |
| 2007/0261070 A1 | 11/2007 | Brown et al. |
| 2007/0261075 A1 | 11/2007 | Glasberg |
| 2007/0271300 A1 | 11/2007 | Ramaswamy |
| 2007/0274537 A1 | 11/2007 | Srinivasan |
| 2007/0300280 A1 | 12/2007 | Turner et al. |
| 2008/0005086 A1 | 1/2008 | Moore |
| 2008/0044102 A1 | 2/2008 | Ekin |
| 2008/0046945 A1 | 2/2008 | Hanley |
| 2008/0089551 A1 | 4/2008 | Heather et al. |
| 2008/0138030 A1 | 6/2008 | Bryan et al. |
| 2008/0155588 A1 | 6/2008 | Roberts et al. |
| 2008/0155627 A1 | 6/2008 | O'Connor et al. |
| 2008/0172690 A1 | 7/2008 | Kanojia et al. |
| 2008/0208891 A1 | 8/2008 | Wang et al. |
| 2008/0240562 A1 | 10/2008 | Fukuda et al. |
| 2008/0249986 A1 | 10/2008 | Clarke-Martin |
| 2008/0263620 A1 | 10/2008 | Berkvens et al. |
| 2008/0276266 A1 | 11/2008 | Huchital et al. |
| 2008/0309819 A1 | 12/2008 | Hardacker et al. |
| 2008/0310731 A1 | 12/2008 | Stojancic et al. |
| 2008/0313140 A1 | 12/2008 | Pereira et al. |
| 2009/0007195 A1 | 1/2009 | Beyabani |
| 2009/0024923 A1 | 1/2009 | Hartwig et al. |
| 2009/0028517 A1 | 1/2009 | Shen et al. |
| 2009/0052784 A1 | 2/2009 | Covell et al. |
| 2009/0087027 A1 | 4/2009 | Eaton et al. |
| 2009/0088878 A1 | 4/2009 | Otsuka et al. |
| 2009/0100361 A1 | 4/2009 | Abello et al. |
| 2009/0116702 A1 | 5/2009 | Conradt |
| 2009/0131861 A1 | 5/2009 | Braig et al. |
| 2009/0172728 A1 | 7/2009 | Shkedi et al. |
| 2009/0172746 A1 | 7/2009 | Aldrey et al. |
| 2009/0175538 A1 | 7/2009 | Bronstein et al. |
| 2009/0213270 A1 | 8/2009 | Ismert et al. |
| 2009/0235312 A1 | 9/2009 | Morad et al. |
| 2010/0010648 A1 | 1/2010 | Bull et al. |
| 2010/0042790 A1 | 2/2010 | Mondal et al. |
| 2010/0083299 A1 | 4/2010 | Nelson |
| 2010/0115543 A1 | 5/2010 | Falcon |
| 2010/0115574 A1 | 5/2010 | Hardt et al. |
| 2010/0125870 A1 | 5/2010 | Ukawa et al. |
| 2010/0166257 A1 | 7/2010 | Wredenhagen |
| 2010/0199295 A1 | 8/2010 | Katpelly et al. |
| 2010/0202700 A1* | 8/2010 | Rezazadeh ............ G06T 7/0002 382/199 |
| 2010/0235486 A1 | 9/2010 | White et al. |
| 2010/0253838 A1 | 10/2010 | Garg et al. |
| 2010/0269138 A1 | 10/2010 | Krikorian et al. |
| 2010/0306805 A1 | 12/2010 | Neumeier et al. |
| 2010/0306808 A1 | 12/2010 | Neumeier et al. |
| 2010/0328529 A1* | 12/2010 | Hirayama ............ H04N 7/0132 348/E7.003 |
| 2011/0015996 A1 | 1/2011 | Kassoway et al. |
| 2011/0026761 A1 | 2/2011 | Radhakrishnan et al. |
| 2011/0041154 A1 | 2/2011 | Olson |
| 2011/0055552 A1 | 3/2011 | Francis et al. |
| 2011/0096955 A1 | 4/2011 | Voloshynovskiy et al. |
| 2011/0251987 A1 | 4/2011 | Buchheit |
| 2011/0247042 A1 | 10/2011 | Mallinson |
| 2011/0289099 A1 | 11/2011 | Quan |
| 2011/0299770 A1 | 12/2011 | Vaddadi et al. |
| 2011/0307683 A1 | 12/2011 | Spackman |
| 2012/0017240 A1 | 1/2012 | Shkedi |
| 2012/0054143 A1 | 3/2012 | Doig et al. |
| 2012/0076357 A1 | 3/2012 | Yamamoto et al. |
| 2012/0095958 A1 | 4/2012 | Pereira et al. |
| 2012/0117584 A1 | 5/2012 | Gordon |
| 2012/0158511 A1 | 6/2012 | Lucero et al. |
| 2012/0174155 A1 | 7/2012 | Mowrey et al. |
| 2012/0177249 A1 | 7/2012 | Levy et al. |
| 2012/0185566 A1 | 7/2012 | Nagasaka |

(56) References Cited

U.S. PATENT DOCUMENTS

| | | |
|---|---|---|
| 2012/0224749 A1* | 9/2012 | Chen .................. G06T 7/223 382/107 |
| 2012/0272259 A1 | 10/2012 | Cortes |
| 2012/0281924 A1* | 11/2012 | Coulombe ............ H04N 19/85 382/218 |
| 2012/0294586 A1 | 11/2012 | Weaver et al. |
| 2012/0317240 A1 | 12/2012 | Wang |
| 2012/0324494 A1 | 12/2012 | Burger et al. |
| 2012/0327450 A1 | 12/2012 | Sagan |
| 2013/0007191 A1 | 1/2013 | Klappert et al. |
| 2013/0007792 A1 | 1/2013 | Jeon et al. |
| 2013/0042262 A1 | 2/2013 | Riethmueller |
| 2013/0050564 A1 | 2/2013 | Adams et al. |
| 2013/0054356 A1 | 2/2013 | Richman et al. |
| 2013/0058522 A1* | 3/2013 | Raesig ................... H04L 67/60 709/219 |
| 2013/0067523 A1 | 3/2013 | Etsuko et al. |
| 2013/0070847 A1 | 3/2013 | Iwamoto et al. |
| 2013/0108173 A1 | 5/2013 | Lienhart et al. |
| 2013/0139209 A1 | 5/2013 | Urrabazo et al. |
| 2013/0198768 A1 | 8/2013 | Kitazato |
| 2013/0202150 A1 | 8/2013 | Sinha et al. |
| 2013/0205315 A1 | 8/2013 | Sinha |
| 2013/0209065 A1 | 8/2013 | Yeung |
| 2013/0212609 A1 | 8/2013 | Sinha et al. |
| 2013/0290502 A1 | 10/2013 | Bilobrov |
| 2013/0297727 A1 | 11/2013 | Levy |
| 2013/0318096 A1 | 11/2013 | Cheung |
| 2014/0016696 A1 | 1/2014 | Nelson |
| 2014/0025837 A1 | 1/2014 | Swenson |
| 2014/0052737 A1 | 2/2014 | Ramanathan et al. |
| 2014/0078400 A1* | 3/2014 | Vajjhula ................ H04N 21/84 348/E5.062 |
| 2014/0082663 A1 | 3/2014 | Neumeier et al. |
| 2014/0088742 A1 | 3/2014 | Srinivasan |
| 2014/0105567 A1 | 4/2014 | Casagrande |
| 2014/0123165 A1 | 5/2014 | Mukherjee et al. |
| 2014/0130092 A1 | 5/2014 | Kunisetty |
| 2014/0153571 A1 | 6/2014 | Neugebauer |
| 2014/0188487 A1 | 7/2014 | Perez Gonzalez |
| 2014/0193027 A1 | 7/2014 | Scherf |
| 2014/0195548 A1 | 7/2014 | Harron |
| 2014/0196085 A1 | 7/2014 | Dunker |
| 2014/0201769 A1 | 7/2014 | Neumeier et al. |
| 2014/0201772 A1 | 7/2014 | Neumeier et al. |
| 2014/0201787 A1 | 7/2014 | Neumeier et al. |
| 2014/0219554 A1 | 8/2014 | Yamaguchi et al. |
| 2014/0237576 A1 | 8/2014 | Zhang |
| 2014/0258375 A1 | 9/2014 | Munoz |
| 2014/0270489 A1 | 9/2014 | Jaewhan et al. |
| 2014/0270504 A1 | 9/2014 | Baum et al. |
| 2014/0270505 A1 | 9/2014 | McCarthy |
| 2014/0282671 A1 | 9/2014 | McMillan |
| 2014/0293794 A1 | 10/2014 | Zhong et al. |
| 2014/0344880 A1 | 11/2014 | Geller et al. |
| 2015/0026728 A1 | 1/2015 | Carter et al. |
| 2015/0040074 A1 | 2/2015 | Hofmann et al. |
| 2015/0100979 A1 | 4/2015 | Moskowitz et al. |
| 2015/0112988 A1 | 4/2015 | Pereira et al. |
| 2015/0120839 A1 | 4/2015 | Kannan et al. |
| 2015/0121409 A1 | 4/2015 | Zhang et al. |
| 2015/0128161 A1 | 5/2015 | Conrad et al. |
| 2015/0131845 A1 | 5/2015 | Forouhar |
| 2015/0163545 A1 | 6/2015 | Freed et al. |
| 2015/0181311 A1 | 6/2015 | Navin et al. |
| 2015/0188967 A1 | 7/2015 | Paulauskas |
| 2015/0205727 A1 | 7/2015 | Kimmel |
| 2015/0229998 A1 | 8/2015 | Kaushal et al. |
| 2015/0256891 A1 | 9/2015 | Kim et al. |
| 2015/0302890 A1 | 10/2015 | Ergen et al. |
| 2015/0382075 A1 | 12/2015 | Neumeier et al. |
| 2016/0050445 A1* | 2/2016 | Baghdassarian ... H04N 21/6547 725/109 |
| 2016/0073166 A1 | 3/2016 | Hu |
| 2016/0112319 A1 | 4/2016 | Hasani |
| 2016/0154880 A1 | 6/2016 | Hoarty |
| 2016/0227261 A1 | 8/2016 | Neumeier et al. |
| 2016/0227291 A1 | 8/2016 | Shaw et al. |
| 2016/0286244 A1 | 9/2016 | Chang et al. |
| 2016/0307043 A1 | 10/2016 | Neumeier |
| 2016/0314794 A1 | 10/2016 | Leitman et al. |
| 2016/0316262 A1 | 10/2016 | Chen |
| 2016/0330529 A1 | 11/2016 | Byers |
| 2016/0353172 A1 | 12/2016 | Miller et al. |
| 2016/0359791 A1 | 12/2016 | Zhang et al. |
| 2017/0017645 A1 | 1/2017 | Neumeier et al. |
| 2017/0017651 A1 | 1/2017 | Neumeier et al. |
| 2017/0017652 A1 | 1/2017 | Neumeier et al. |
| 2017/0019716 A1 | 1/2017 | Neumeier et al. |
| 2017/0019719 A1 | 1/2017 | Neumeier et al. |
| 2017/0026671 A1 | 1/2017 | Neumeier et al. |
| 2017/0031573 A1 | 2/2017 | Kaneko |
| 2017/0032033 A1 | 2/2017 | Neumeier et al. |
| 2017/0032034 A1 | 2/2017 | Neumeier et al. |
| 2017/0090814 A1 | 3/2017 | Yeung |
| 2017/0134770 A9 | 5/2017 | Neumeier et al. |
| 2017/0186042 A1 | 6/2017 | Wong et al. |
| 2017/0311014 A1 | 10/2017 | Fleischman |
| 2017/0325005 A1 | 11/2017 | Liassides |
| 2017/0353776 A1 | 12/2017 | Holden et al. |
| 2018/0227646 A9 | 8/2018 | Navin et al. |

FOREIGN PATENT DOCUMENTS

| | | |
|---|---|---|
| CN | 101162470 | 4/2008 |
| CN | 1681304 | 7/2010 |
| CN | 102377960 | 3/2012 |
| CN | 101681373 | 9/2012 |
| EP | 248 533 | 8/1994 |
| EP | 1578126 | 9/2005 |
| EP | 1 760 693 | 3/2007 |
| EP | 1504445 B1 | 8/2008 |
| EP | 2 084 624 | 8/2009 |
| EP | 2 352 289 | 8/2011 |
| EP | 2 541 963 A2 | 1/2013 |
| EP | 2 685 450 A1 | 1/2014 |
| GB | 2457694 | 8/2009 |
| WO | 0144992 | 6/2001 |
| WO | 2005/101998 | 11/2005 |
| WO | 2007/114796 | 10/2007 |
| WO | 2008/065340 | 6/2008 |
| WO | 2009/131861 | 10/2009 |
| WO | 2009/150425 | 12/2009 |
| WO | 2010/135082 | 11/2010 |
| WO | 2011/090540 A2 | 7/2011 |
| WO | 2012/057724 | 5/2012 |
| WO | 2012/108975 | 8/2012 |
| WO | 2012/170451 | 12/2012 |
| WO | 2014/142758 | 9/2014 |
| WO | 2014/145929 A1 | 9/2014 |
| WO | 2015/100372 A1 | 7/2015 |
| WO | 2016033676 A1 | 3/2016 |
| WO | 2016/123495 | 8/2016 |
| WO | 2016/168556 | 10/2016 |
| WO | 2017/011758 | 1/2017 |
| WO | 2017/011792 | 1/2017 |

OTHER PUBLICATIONS

International Search Report and Written Opinion dated Apr. 26, 2016 for PCT Application No. PCT/US2016/015681, 13 pages.

"How to: Watch from the beginning |About DISH" (Dec. 31, 2014) XP055265764, retrieved on Apr. 15, 2016 from URL:http://about.dish.com/blog/hopper/how-watch-beginning 2 pages.

International Search Report and Written Opinion dated Jun. 24, 2016 for PCT Application No. PCT/US2016/027691, 13 pages.

Gionis et al., "Similarity Search in High Dimension via Hashing", Proceedings of the 25th VLDB Conference, 1999, 12 pages.

Huang, "Bounded Coordinate System Indexing for Real-time Video Clip Search", Retrieved from the Internet:URL:http://staff.itee.uq.edu.aujzxf/papers/TOIS.pdf, Jan. 1, 2009, 32 pages.

(56) References Cited

OTHER PUBLICATIONS

Kim et al., "Edge-Based Spatial Descriptor Using Color Vector Angle for Effective Image Retrieval", Modeling Decisions for Artificial Intelligence; [Lecture Notes in Computer Science Lecture Notes in Artificial Intelligence, Jul. 1, 2005, pp. 365-375.
Liu et al., "Near-duplicate video retrieval", ACM Computing Surveys, vol. 45, No. 4, Aug. 30, 2013, pp. 1-23.
International Search Report and Written Opinion dated Oct. 12, 2016 for PCT Application No. PCT/US2016/042522, 13 pages.
International Search Report and Written Opinion dated Oct. 11, 2016 for PCT Application No. PCT/US2016/042621, 13 pages.
International Search Report and Written Opinion dated Oct. 20, 2016 for PCT Application No. PCT/US2016/042611, 12 pages.
Scouarnec et al., "Cache policies for cloud-based systems:To keep or not to keep", 2014 IEEE 7th International Conference on Cloud Computing, IEEE XP032696624, Jun. 27, 2014, pp. 1-8.
International Search Report and Written Opinion dated Oct. 25, 2016 for PCT Application No. PCT/US2016/042564, 14 pages.
Anonymous; "Cache (computing)" Wikipedia, the free encyclopedia, URL:http://en.wikipedia.org/w/index.phpti tle=Cache (computing) &oldid=474222804, Jan. 31, 2012; 6 pages.
International Search Report and Written Opinion dated Oct. 24, 2016 for PCT Application No. PCT/US2016/042557, 11 pages.
Anil K. Jain, "Image Coding via a Nearest Neighbors Image Model" IEEE Transactions on Communications, vol. Com-23, No. 3, Mar. 1975, pp. 318-331.
Lee et al., "Fast Video Search Algorithm for Large Video Database Using Adjacent Pixel Intensity Difference Quantization Histogram Feature" International Journal of Computer Science and Network Security, vol. 9, No. 9, Sep. 2009, pp. 214-220.
Li et al., A Confidence Based Recognition System for TV Commercial Extraction, Conferences in Research and Practice in Information Technology vol. 75, 2008.
International Search Report and Written Opinion dated Jul. 27, 2011 for PCT Application No. PCT/US2010/057153, 8 pages.
International Search Report and Written Opinion dated Aug. 31, 2011 for PCT Application No. PCT/US2010/057155, 8 pages.
International Search Report and Written Opinion dated Aug. 26, 2014 for PCT Application No. PCT/US2014/030782; 11 pages.
International Search Report and Written Opinion dated Jul. 21, 2014 for PCT Application No. PCT/US2014/030795; 10 pages.
International Search Report and Written Opinion, dated Jul. 25, 2014 for PCT Application No. PCT/US2014/030805, 10 pages.
Extended European Search Report dated Mar. 7, 2013 for European Application No. 12178359.1, 8 pages.
Extended European Search Report dated Oct. 11, 2013 for European Application No. 10844152.8, 19 pages.
Kabal (P.), Ramachandran (R.P.): The computation of line spectral frequencies using Chebyshev polynomials, IEEE Trans. on ASSP, vol. 34, No. 6, pp. 1419-1426, 1986.
Itakura (F.): Line spectral representation of linear predictive coefficients of speech signals, J. Acoust. Soc. Amer., vol. 57, Supplement No. 1, S35, 1975, 3 pages.
Bistritz (Y.), Pellerm (S.): Immittance Spectral Pairs (ISP) for speech encoding, Proc. ICASSP'93, pp. 11-19 to 11-12.
International Search Report and Written Opinion dated Mar. 8, 2016 for PCT Application No. PCT/ US2015/062945; 9 pages.
Extended European Search Report dated Dec. 21, 2016 for European Application No. 14763506.4, 11 pages.
Extended European Search Report dated Nov. 23, 2016 for European Application No. 14764182.3, 10 pages.
Extended European Search Report dated Jan. 24, 2017 for European Application No. 14762850.7, 12 pages.
Extended European Search Report dated Jun. 16, 2017, for European Patent Application No. 14873564.0, 8 pages.
Extended European Search Report dated Jun. 28, 2019, for European Patent Application No. 19166400.2, 9 pages.
U.S. Appl. No. 14/551,933, "Final Office Action", dated May 23, 2016, 19 pages.
U.S. Appl. No. 14/551,933, "Non-Final Office Action", dated Oct. 17, 2016, 15 pages.
U.S. Appl. No. 14/551,933, "Non-Final Office Action", dated Dec. 31, 2015, 24 pages.
U.S. Appl. No. 14/551,933, "Notice of Allowance", dated Mar. 21, 2017, 8 pages.
U.S. Appl. No. 14/217,039, "Non-Final Office Action", dated May 23, 2014, 27 pages.
U.S. Appl. No. 14/217,039, "Final Office Action", dated Nov. 7, 2014, 15 pages.
U.S. Appl. No. 14/217,039, "Notice of Allowance", dated Jan. 29, 2015, 8 pages.
U.S. Appl. No. 14/678,856, "Non-Final Office Action", dated Dec. 1, 2015, 28 pages.
U.S. Appl. No. 14/678,856, "Notice of Allowance", dated May 20, 2016, 9 pages.
U.S. Appl. No. 14/217,075, "Non-Final Office Action", dated Jul. 16, 2014, 39 pages.
U.S. Appl. No. 14/217,075, "Notice of Allowance ", dated Feb. 20, 2015, 51 pages.
U.S. Appl. No. 14/217,094, "Notice of Allowance ", dated Sep. 4, 2014, 30 pages.
U.S. Appl. No. 14/217,375, "Non-Final Office Action", dated Apr. 1, 2015, 39 pages.
U.S. Appl. No. 14/217,375, "Notice of Allowance", dated Apr. 1, 2015, 31 pages.
U.S. Appl. No. 14/217,425, "Non-Final Office Action", dated Apr. 7, 2015, 12 pages.
U.S. Appl. No. 14/217,425, "Notice of Allowance", dated May 20, 2015, 15 pages.
U.S. Appl. No. 14/217,435, "Non-Final Office Action", dated Nov. 24, 2014, 9 pages.
U.S. Appl. No. 14/217,435, "Notice of Allowance", dated Jun. 5, 2015, 9 pages.
U.S. Appl. No. 15/011,099, "First Action Interview Office Action Summary", dated May 9, 2017, 6 pages.
U.S. Appl. No. 15/011,099, "First Action Interview Pilot Program Pre-Interview Communication", dated Feb. 28, 2017, 5 pages.
U.S. Appl. No. 12/788,721, "Non-Final Office Action", dated Mar. 28, 2012, 15 Pages.
U.S. Appl. No. 12/788,721, "Final Office Action", dated Aug. 15, 2012, 22 Pages.
U.S. Appl. No. 12/788,721, "Notice of Allowance", dated Aug. 15, 2013, 16 Pages.
U.S. Appl. No. 14/763,158, "Non-Final Office Action", dated Jun. 27, 2016, 16 Pages.
U.S. Appl. No. 14/763,158, "Final Office Action", dated Sep. 7, 2016, 12 Pages.
U.S. Appl. No. 14/763,158, "Notice of Allowance", dated Mar. 17, 2016, 8 Pages.
U.S. Appl. No. 14/807,849, "Non-Final Office Action", dated Nov. 25, 2015, 12 Pages.
U.S. Appl. No. 14/807,849, "Final Office Action", dated Apr. 19, 2016, 13 pages.
U.S. Appl. No. 14/807,849, "Non-Final Office Action", dated Feb. 28, 2017, 10 Pages.
U.S. Appl. No. 14/089,003, "Notice of Allowance", dated Jul. 30, 2014, 24 Pages.
U.S. Appl. No. 12/788,748, "Non-Final Office Action", dated Jan. 10, 2013, 10 Pages.
U.S. Appl. No. 12/788,748, "Final Office Action", dated Nov. 21, 2013, 13 Pages.
U.S. Appl. No. 12/788,748, "Notice of Allowance", dated Mar. 6, 2014, 7 Pages.
U.S. Appl. No. 14/953,994, "Non-Final Office Action", dated Mar. 3, 2016, 34 Pages.
U.S. Appl. No. 14/953,994, "Final Office Action", dated Jun. 1, 2016, 36 Pages.
U.S. Appl. No. 14/953,994, "Notice of Allowance", dated Aug. 31, 2016, 15 Pages.
U.S. Appl. No. 14/807,849, "Final Office Action", dated Jun. 22, 2017, 10 pages.

(56) References Cited

OTHER PUBLICATIONS

U.S. Appl. No. 15/011,099, "Final Office Action", dated Jul. 24, 2017, 22 pages.
U.S. Appl. No. 15/240,801, "Non-Final Office Action", dated Aug. 11, 2017, 18 pages.
U.S. Appl. No. 15/240,815, "Non-Final Office Action", dated Aug. 23, 2017, 15 pages.
U.S. Appl. No. 15/211,345, "First Action Interview Pilot Program Pre-Interview Communication", dated Sep. 19, 2017, 8 pages.
U.S. Appl. No. 14/807,849, "Notice of Allowance", dated Nov. 30, 2017, 9 Pages.
U.S. Appl. No. 15/240,801, "Final Office Action", dated Dec. 22, 2017, 24 pages.
U.S. Appl. No. 15/011,099, "Non-Final Office Action", dated Jan. 22, 2018, 23 pages.
U.S. Appl. No. 15/240,815, "Final Office Action", dated Mar. 2, 2018, 14 pages.
U.S. Appl. No. 15/211,345, "Final Office Action", dated Mar. 2, 2018, 14 pages.
Extended European Search Report dated Mar. 22, 2018 for European Application No. 15865033.3, 10 pages.
U.S. Appl. No. 15/099,842, "Final Office Action", dated Apr. 2, 2018, 8 pages.
U.S. Appl. No. 15/210,730, "Notice of Allowance", dated May 23, 2018, 10 pages.
U.S. Appl. No. 15/796,706, "Non-Final Office Action", dated Jun. 26, 2018, 17 pages.
U.S. Appl. No. 15/011,099, "Notice of Allowance", dated Jun. 28, 2018, 12 pages.
U.S. Appl. No. 15/796,698, "Non-Final Office Action", dated Jul. 5, 2018, 15 pages.
U.S. Appl. No. 15/240,801, "Notice of Allowance", dated Aug. 30, 2018, 9 pages.
U.S. Appl. No. 15/211,345, "Non-Final Office Action", dated Sep. 4, 2018, 13 pages.
U.S. Appl. No. 15/099,842, "Notice of Allowance", dated Sep. 7, 2018, 10 pages.
U.S. Appl. No. 15/240,815, "Notice of Allowance", dated Sep. 12, 2018, 9 pages.
U.S. Appl. No. 15/290,848, "First Action Interview Office Action Summary", dated Nov. 2, 2018, 5 pages.
U.S. Appl. No. 15/796,692, "Notice of Allowance", dated Dec. 5, 2018, 8 pages.
U.S. Appl. No. 15/796,698, "Notice of Allowance", dated Dec. 20, 2018, 8 pages.
U.S. Appl. No. 15/796,706, "Notice of Allowance", dated Jan. 11, 2019, 9 pages.
U.S. Appl. No. 15/211,508, "Non-Final Office Action", dated Jan. 10, 2019, 20 pages.
U.S. Appl. No. 15/211,492, "Non-Final Office Action", dated Jan. 11, 2019, 19 pages.
U.S. Appl. No. 16/141,598, "First Action Interview Office Action Summary", dated Jan. 11, 2019, 8 pages.
U.S. Appl. No. 15/290,848, "Non-Final Office Action", dated Mar. 5, 2019, 5 pages.
U.S. Appl. No. 15/211,991, "Non-Final Office Action", dated Feb. 26, 2019, 8 pages.
U.S. Appl. No. 15/211,345, "Notice of Allowance", dated Mar. 20, 2019, 6 pages.
U.S. Appl. No. 16/210,796, "Non-Final Office Action", dated Mar. 22, 2019, 7 pages.
U.S. Appl. No. 16/141,598, "Notice of Allowance", dated Apr. 25, 2019, 11 pages.
U.S. Appl. No. 15/211,508, "Final Office Action", dated Jun. 20, 2019, 20 pages.
U.S. Appl. No. 15/211,492, "Final Office Action", dated Jun. 20, 2019, 18 pages.
U.S. Appl. No. 16/210,796, "Notice of Allowance", dated Jul. 11, 2019, 9 pages.
U.S. Appl. No. 16/214,875, "Non-Final Office Action", dated Jul. 29, 2019, 12 pages.
U.S. Appl. No. 15/211,991, "Final Office Action", dated Oct. 31, 2019, 9 pages.
U.S. Appl. No. 16/214,875, "Final Office Action", dated Jan. 29, 2020, 13 pages.
U.S. Appl. No. 16/290,055, "Non-Final Office Action", dated Feb. 19, 2020, 18 pages.
U.S. Appl. No. 16/379,663, "Non-Final Office Action", dated Feb. 24, 2020, 19 pages.
U.S. Appl. No. 15/211,991, "Non-Final Office Action", dated Mar. 19, 2020, 19 pages.
U.S. Appl. No. 15/211,508, "Non-Final Office Action", dated Apr. 3, 2020, 25 pages.
U.S. Appl. No. 15/211,492, "Non-Final Office Action", dated Apr. 6, 2020, 18 pages.
U.S. Appl. No. 16/290,055, "Notice of Allowance", dated Jun. 25, 2020, 10 pages.
U.S. Appl. No. 16/214,875, "Non-Final Office Action", dated Jul. 15, 2020, 21 pages.
U.S. Appl. No. 16/379,663, "Final Office Action", dated Jul. 28, 2020, 15 pages.
U.S. Appl. No. 16/444,152, "Notice of Allowance", dated Aug. 19, 2020, 6 pages.
U.S. Appl. No. 15/211,991, "Notice of Allowance", dated Sep. 17, 2020, 13 pages.
U.S. Appl. No. 15/211,492, "Final Office Action", dated Oct. 26, 2020, 18 pages.
U.S. Appl. No. 15/211,508, "Notice of Allowance", dated Oct. 27, 2020, 13 pages.
U.S. Appl. No. 16/519,292, "Notice of Allowance ", dated Oct. 29, 2020, 10 pages.
U.S. Appl. No. 16/214,875, "Final Office Action", dated Nov. 30, 2020, 17 pages.
U.S. Appl. No. 16/379,663, "Notice of Allowance", dated Feb. 16, 2021, 9 pages.

* cited by examiner

DETECTION OF COMMON MEDIA SEGMENTS

CROSS-REFERENCES TO RELATED APPLICATIONS

This application is a continuation of U.S. patent application Ser. No. 16/444,152, filed Jun. 18, 2019, which is a continuation of U.S. patent application Ser. No. 15/211,345, filed Jul. 15, 2016, which claims the benefit of U.S. Provisional Application No. 62/193,322, filed on Jul. 16, 2015, the disclosure of each of which is incorporated by reference herein in its entirety for all purposes.

This application is related to U.S. patent application Ser. No. 14/089,003 filed on Nov. 25, 2013, now U.S. Pat. No. 8,898,714, issued on Nov. 25, 2014; U.S. patent application Ser. No. 14/217,075, now U.S. Pat. No. 9,055,309, issued on Jun. 9, 2015; U.S. Provisional Application No. 61/182,334 filed on May 29, 2009; U.S. Provisional Application No. 61/290,714 filed on Dec. 29, 2009; U.S. patent application Ser. No. 12/788,748, now U.S. Pat. No. 8,769,584, issued on Jul. 1, 2014; and U.S. patent application Ser. No. 12/788,721, now U.S. Patent No. 595,781, issued on Nov. 26, 2013, all of which are hereby incorporated by reference in their entirety.

BRIEF SUMMARY

Automatic Content Recognition (ACR) systems provide information about content being displayed at a particular point in time by a specific media display device. An ACR system may be implemented as a video matching system. Generally, a video matching system may operate by obtaining data samples from known video data sources, generating identification information from these samples, and storing identification information, along with known information about the video, in a database. A particular media device can take data samples from an unknown video being displayed, generate identification information from the samples, and attempt to match the identification information with identification information stored in the database. When a match is found, the particular media device can receive, from the database, the information that is known about the video. Generally, the matching operations conducted by the media device can be conducted in real time, that is, as the video is being displayed on the device.

Provided are systems, methods, and computer-program products for identifying a media content stream when the media content stream is playing an unscheduled, common media segment. In various implementations, a computing device may be configured to identify media content being played by a media display device at a particular time. The computing device may be configured to implement a video matching system. The computing device may receive a plurality of media content streams, where at least two of the plurality of media content streams concurrently includes a same unscheduled media segment. The computing device may be configured to determining that the media display device is playing the unscheduled media segment at a current time. To make this determination, the computing device may examine the media content available at the current time in each of the plurality of media content streams. The computing device may further be configured to determine identification information from the media content included in the media content stream that is being played by the media display device at the current time. The identification information may identify the media content stream. The computing device may further determine contextually-related content. The contextually-related content may be disabled while the unscheduled media segment is being played by the media display device. The computing device may further be configured to display the media content stream and the contextually-related content after the unscheduled media segment has been played.

In various implementations, the contextually-related content is selected using the identification information that identifies the media content stream. The contextually-related content may be provided to the media display device.

In various implementations, identifying the media content stream may include detecting a graphic superimposed onto the unscheduled media segment while the unscheduled media segment is being played by the media display device. The graphic may provide additional identification information for the media content stream.

In various implementations, media content used to determine the identification information may include media content included in the media content stream before or after the unscheduled media segment.

In various implementations, the computing device may be configured to determine that the media display device has been playing the unscheduled media segment since a beginning of the unscheduled media segment. In these implementations, the computing device may identify the media content stream using identification information determined for media content included in the media content stream prior to the unscheduled media segment.

In various implementations, the computing device may be configured to determine that the media display device has been playing the unscheduled media segment since a point after a beginning of the unscheduled media segment. In these implementations, the computing device may identify the media content stream using identification information for media content included in the media content stream after the unscheduled media segment.

BRIEF DESCRIPTION OF THE DRAWINGS

Illustrative embodiments are described in detail below with reference to the following figures.

DETAILED DESCRIPTION

Figure 1:
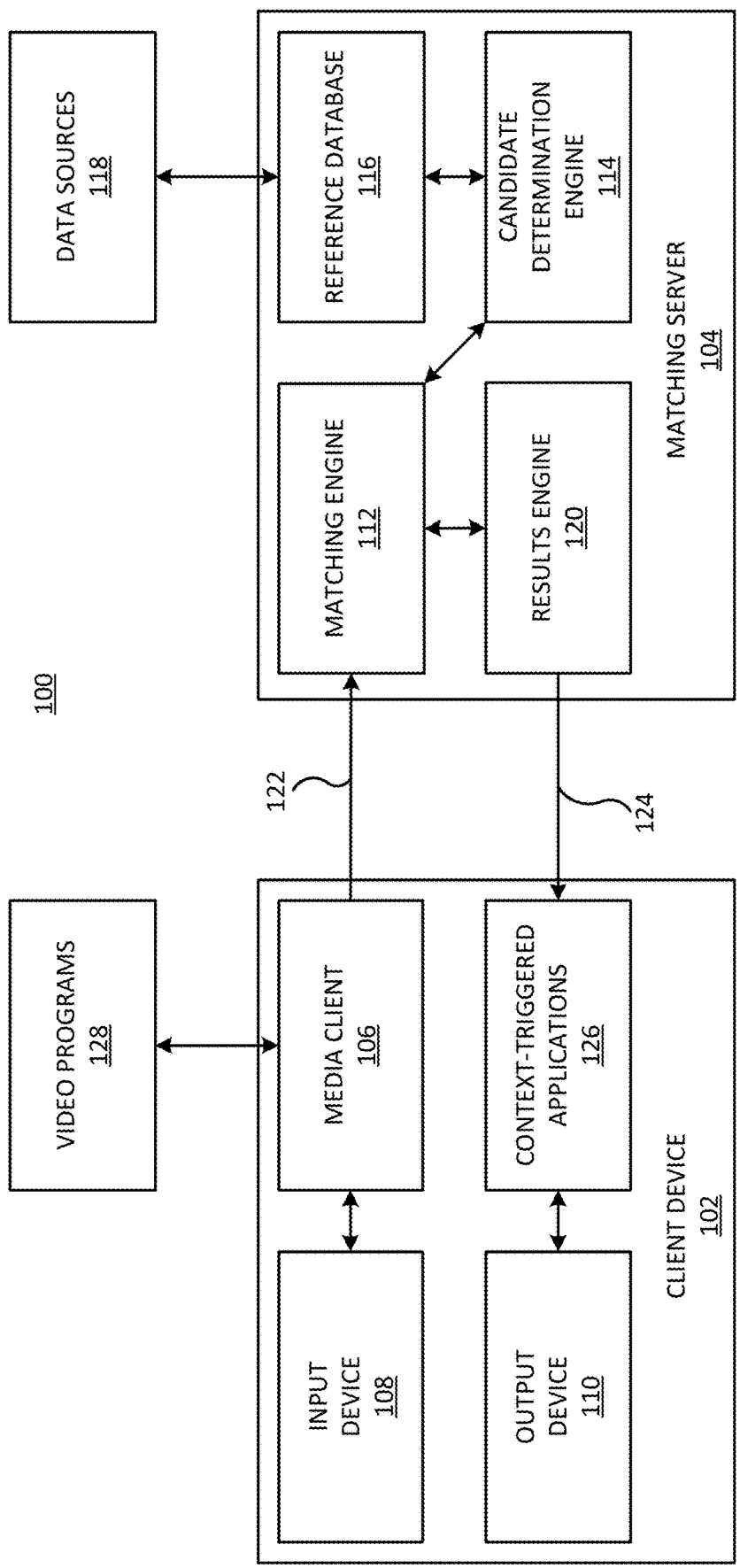
FIG. 1 illustrates a matching system that can identify unknown content.

Automatic Content Recognition (ACR) systems provide information about content being displayed at a particular point in time by a specific media display device. For example, an ACR system can provide information such as the channel being viewed, the title of the video, some text identifying the video or the content of the video, the portion of the video being viewed, one or more categories for the video, the author and/or producer of the video, and so on. This information can subsequently be used, for example, to provide viewership statistics for the video (e.g., how frequently the video has been viewed by how many people, at what times, etc.) and/or to suggest targeted content for the viewer, such as advertising or interactive content.

An ACR system may be implemented as a video matching system. Generally, a video matching system may operate by obtaining data samples from known video data sources, generating identification information from these samples, and storing identification information, along with known information about the video, in a database. A particular media device can use a similar process to identify unknown video content. Specifically, the media device can take data samples from an unknown video being displayed, generate identification information from the samples, and attempt to match the identification information with identification information stored in the database. When a match is found, the particular media device can receive, from the database, the information that is known about the video. Generally, the matching operations conducted by the media device can be conducted in real time, that is, as the video is being displayed on the device.

A video matching system as described above may, however, have difficulty identifying the media content being displayed by a media device when the same content is being displayed on multiple channels at the same time. Furthermore, the system may not be able to determine, for example, which channel the viewer is watching, or what contextually-related information to provide.

One example of multiple channels displaying the same content at the same time occurs when multiple local televisions stations provide syndicated content to support "breaking news" stories. For example, a national broadcast agency (e.g., American Broadcasting Company (ABC), Columbia Broadcasting System (CBS), National Broadcasting Company (NBC), Fox Network, Cable News Network (CNN), etc.) may provide a video feed when political speeches, natural disasters, or human-made incidents occur. In this example, multiple national and/or local broadcast channels may pick up the video feed as it is being broadcast by the national broadcaster, and may re-broadcast the feed to local viewers. As result, multiple channels may be displaying identically video content at the same time. The same situation may occur in other contexts, such as when multiple channels display the same commercial or sporting event at the same time.

As noted above, a video matching system may rely on data samples collected from known video sources, such as local and national channels, where programming information may provide information such as the title or other identifying string for video content, and other information about the video content. When multiple channels display the same content, however, the video matching system may not be able to uniquely identify the video content. For example, the video matching system may associate one video with two or more channels. Subsequently, should a media device tune into one of the channels that is carrying the same content, the video matching system may not be able to determine which channel the media device has tuned into.

In various implementations, a video matching system may be configured to improve the accuracy of automated content recognition in the presence of ambiguity caused by a common video segment appearing simultaneously on multiple channels. Without accuracy improvements, the presence of common video segments displaying simultaneously on multiple channels being monitored may cause ambiguity in identifying content being displayed by a media device. In various implementations, the video matching system may use information from media content displayed on the media display device before and/or after the media device began to display the common video segment. Using this information, the video matching system is able to attach identification information to samples taken from the common video segment.

On national and local channels that may at some point display a common video segment, the channel may provide some uniquely identifiable content prior to displaying the common video segment. In various implementations, this unique content can be used to assist in identifying the common video segment. For example, in certain broadcast news, there are parts of the news program that are known to be from the local channel. For example, the news program may introduce and/or comment on the common video segment before the common video segment is displayed. The introductory segment may be referred to as "talking heads" segment, that is, a segment where two or more people are seated behind a desk and are framed in the video from the center chest up. When a "talking heads" segment is detected, a video matching system can, for example, add a new timeline signal or events that can be used to assist in identifying the common video segment.

In various implementations, a media display device that is configured to use the video matching system may obtain and track timeline signals or events, such as those that may be generated for "talking heads" segments. In these implementations, the media device may check for a timeline event when the media device encounters an unknown and possibly common video segment. In one case, the media device may not find a timeline event, which may indicate to the media device that the device has just been turned on or tuned in to the channel displaying the common video content. In this case, the data collection process of the media device may be configured to avoid using the common video segment for identification purposes. In other cases, the media device may use timeline events received before and/or after the common video segment to generate identification information for the common video segment.

In various implementations, the video matching may also use timeline events to more rapidly identify commercials. Generally, the amount of time a video matching system takes to obtain sufficient samples to match a known commercial with a high-degree of probability may be referred to as the "commercial confidence interval." Using the techniques described herein, the commercial confidence interval may be reduced when the media device uses timeline events within a specified window of past time.

I. Audio-Video Content

In various implementations, a video content matching system may be configured to identify media content being displayed by a media display device. In various implementations, the video content system can be used to provide contextually targeted content to a media display devices, where the targeted content is selected based the identified media content.

Media content includes video, audio, text, graphics, tactile representations of visual and/or audible data, and various combinations of visual, audible, or tactile information. For example, media content can include synchronized audio and video, such as movies or television shows. As another example, media content can include text and graphics, such as web pages. As another example, media content can include photographs and music, such as a photo slide show with a soundtrack.

A media display device can be a device capable of displaying various media content. Media display devices may include, for example, televisions systems. Television (TV) systems include, for example, televisions such as web TVs and connected TVs (also known as "Smart TVs"), and optionally equipment incorporated in or co-located with the TV, such as set-top boxes (STB), a digital video disc (DVD) players, and/or digital video recorders (DVR).

Connected TVs are TVs that are connected to a network, such as the Internet. In various implementations, a network connected TV may be connected to a local wired or wireless network, such as for example in a private home or in a business office. A Connected TV can run an application platform such as Google's Android, or some other platform configured to provide interactive, smartphone or tablet-like software applications, which also may be referred to as "apps."

In various implementations, a media display device may receive signals, such as television signals. Televisions signals include, for example, signals representing video and audio data, broadcast together and synchronized for simultaneous display. For example, television signals may include television programs and/or commercials. In some cases, television signals may include additional information relating to the audio-video content in a television signals. This additional data may be referred to as "metadata." The term "metadata" may also be used to describe information that is associated with video or audio-video content transmitted other than as television signals (e.g. transmitted as digitized and/or packetized data over a network). Metadata may include information about the content, such as information identifying the content, a description of the content, one or more categories for the content, an author and/or publisher of the content, and so on. Because metadata is transmitted with the content that the metadata is associated with, the metadata can be used to provide information about the content as the content is being viewed or played.

Not all media display devices have access to metadata. Hence, not all media display devices are able to determine what they are displaying or playing at any given moment. Without this information, a media display device may not be able to provide customized or individualized content or advertisements for a specific viewer. While some information about content being provide to a media display device may be available in the distribution pipeline, this information may be lost or removed by the time the content arrives at the media display device.

In some implementations, metadata may be provided with audio-video content using various methods. For example, in some implementations, identification information may be encoded into the content using watermarks. In these implementations, the identification information may be encoded so that the information is not lost when the content is compressed for transmission and decompressed for display. Such methods, however, may require that a receiving media display device be able to extract the identification information from the content. Additionally, these methods may not enable up-to-the-moment identification of a particular video being played, with fraction-of-a-second identification capability.

In various implementations, advancements in fiber optic and digital transmission technology have enabled the media industry to provide a large channel capacity, where "channels" include traditional broadcast channels, satellite signals, digital channels, streaming content, and/or user-generated content. In some cases, media providers such as satellite systems may be referred to as Multichannel Video Programming Distributors (MVPD). In some implementations, media providers are also able to use the increase data capacity of modern transmission systems to provide some of interactive content, such as interactive television (ITV). The increased processing power of Smart TVS, set-top boxes, and similar devices may further enable interactive content.

Interactive television may enable television systems to serve as a two-way information distribution mechanism in a manner similar to the World Wide Web. Interactive televisions may provide a variety of marketing, entertainment, and educational capabilities, such as for example enabling a viewer to order an advertised product or service, compete against contestants in a game show, participate in a live classroom session, and so on. In some implementations, the interactive functionality may be controlled by a set-top box. In these implementations, the set-top box may execute an interactive program associated with video content, such as a TV broadcast. Interactive functionality may be displayed on the TV's screen and may include icons or menus to allow a viewer to make selections via the TV's remote control or a keyboard.

In various implementations, interactive content may be incorporated into audio-video content. In some implementations, the audio-video content may consist of a broadcast stream. A broadcast stream may also be referred to as a "channel" or a "network feed". The term "broadcast stream" may refer to a broadcast signal received by a television over, for example, an antenna, a satellite, a coaxial cable, a digital subscriber line (DSL) cable, a fiber optic cable, or some other transmission medium. In various implementations, interactive content may be incorporated into a audio-video content using "triggers." Triggers may be inserted into the content for a particular program. Content that includes triggers may be referred to as "enhanced program content" or an "enhanced television program" or and "enhanced video signal." Triggers may be used to alert the media display device (e.g., at a set-top box or a the processor in a Smart TV) that interactive content is available. The trigger may contain information about available content as well as where the interactive content can be found (e.g., a memory address, a network address, and/or a website address). A trigger may also contain information that can be displayed on the media display device to the viewer. For example, information provided by the trigger, may be displayed at the bottom of a screen provided by the media display device. The displayed information may prompt the viewer to perform some action or choose amongst multiple of options.

II. Video Matching

In various implementations, a video content system may be configured to identify media content that is being displayed or played by a media display device. In various implementations, information identifying the content being viewed at a particular moment in time can be used to capture and appropriately respond to a viewer's specific reaction, such as requesting that the content be rewound or requesting that a video be restarted from its beginning. Alternatively or additionally, the identification information can be used to trigger targeted content, such as advertisements, which may be provided by the content provider or an advertiser. Information identifying audio-video content can thus be used to provide viewer-customized, video-on-demand (VoD) capabilities to devices that otherwise do not have Smart TV capabilities.

In various implementations, a video segment be identified by sampling, at periodic intervals, a subset of the pixel data being displayed on the screen of a media display device, and then finding similar pixel data in a content database. In some implementations, a video segment may be identified by extracting audio data associated with the video segment and finding similar audio data in a content database. In some implementations, a video segment may be identified by processing the audio data associated with the video segment using automated speech recognition techniques, and searching text transcriptions from known video content to locate matching text phrases. In some implementations, a video segment may be identified by processing metadata associated with the video segment.

In various implementations, a video matching system may be used to provide contextually targeted content to an interactive media display system. The contextually targeted content may be based on identification of a video segment being displayed, and also on the time at which the video segment is being played (day or evening, 3:00 in the afternoon, etc.) and/or the portion of the video segment that is currently being displayed (e.g., a current offset from the beginning of the video). Here, "playing time" and "offset time" may be used interchangeably to describe the part of a video that is currently being displayed.

In various implementations, a media display device equipped with a content matching system, having identified content that is presently being displayed or played by the media display device, may be able to deduce the subject matter of the content, and interact with the viewer accordingly. For example, the media display device may be able to provide instant access to video-on-demand versions of content, and/or to higher resolutions or 3D formats of the content. Additionally, the media display device may provide the ability to start over, fast forward, pause and re-wind the content. In various implementations, advertising can be included in the content. In these implementations, some or all advertising messages can be customized, such as for example to viewer's geographic location, demographic group, or shopping history. Alternatively or additionally, advertisements can be reduced in number or length, or be eliminated entirely.

In various implementations, once a video segment is identified, the offset time may be determined by sampling a subset of the pixel data (or associated audio data) being displayed or played by a media display device, and finding similar pixel (or audio) data in a content database. In various implementations, the offset time can be determined by extracting audio or image data associated with such video segment and finding similar audio or image data in a content database. In various implementations, the offset time can be determined by processing the audio data associated with such video segment using automated speech recognition techniques. In various implementations, the offset time can determined by processing metadata associated with such video segment.

In various implementations, a system for video matching can be included in a television system. In various implementations, the television system includes a connected TV. In various implementations, a video matching system may be included in part in a connected television and in part on a server connected to the connected television over the Internet.

FIG. 1 illustrates a matching system 100 that can identify unknown content. In some examples, the unknown content can include one or more unknown data points. In such examples, the matching system 100 can match unknown data points with reference data points to identify unknown video segments associated with the unknown data points. The reference data points can be included in a reference database 116.

The matching system 100 includes a client device 102 and a matching server 104. The client device 102 includes a media client 106, an input device 108, an output device 110, and one or more contextual applications 126. The media client 106 (which can include a television system, a computer system, or other electronic device capable of connecting to the Internet) can decode data (e.g., broadcast signals, data packets, or other frame data) associated with video programs 128. The media client 106 can place the decoded contents of each frame of the video into a video frame buffer in preparation for display or for further processing of pixel information of the video frames. The client device 102 can be any electronic decoding system that can receive and decode a video signal. The client device 102 can receive video programs 128 and store video information in a video buffer (not shown). The client device 102 can process the video buffer information and produce unknown data points (which can referred to as "cues"), described in more detail below with respect to FIG. 3. The media client 106 can transmit the unknown data points to the matching server 104 for comparison with reference data points in the reference database 116.

The input device 108 can include any suitable device that allows a request or other information to be input to the media client 106. For example, the input device 108 can include a keyboard, a mouse, a voice-recognition input device, a wireless interface for receiving wireless input from a wireless device (e.g., from a remote controller, a mobile device, or other suitable wireless device), or any other suitable input device. The output device 110 can include any suitable device that can present or otherwise output information, such as a display, a wireless interface for transmitting a wireless output to a wireless device (e.g., to a mobile device or other suitable wireless device), a printer, or other suitable output device.

The matching system 100 can begin a process of identifying a video segment by first collecting data samples from known video data sources 118. For example, the matching server 104 collects data to build and maintain a reference database 116 from a variety of video data sources 118. The video data sources 118 can include media providers of television programs, movies, or any other suitable video source. Video data from the video data sources 118 can be provided as over-the-air broadcasts, as cable TV channels, as streaming sources from the Internet, and from any other video data source. In some examples, the matching server 104 can process the received video from the video data sources 118 to generate and collect reference video data points in the reference database 116, as described below. In some examples, video programs from video data sources 118 can be processed by a reference video program ingest system (not shown), which can produce the reference video data points and send them to the reference database 116 for storage. The reference data points can be used as described above to determine information that is then used to analyze unknown data points.

The matching server 104 can store reference video data points for each video program received for a period of time (e.g., a number of days, a number of weeks, a number of months, or any other suitable period of time) in the reference database 116. The matching server 104 can build and continuously or periodically update the reference database 116 of television programming samples (e.g., including reference data points, which may also be referred to as cues or cue values). In some examples, the data collected is a compressed representation of the video information sampled from periodic video frames (e.g., every fifth video frame, every tenth video frame, every fifteenth video frame, or other suitable number of frames). In some examples, a number of bytes of data per frame (e.g., 25 bytes, 50 bytes, 75 bytes, 100 bytes, or any other amount of bytes per frame) are collected for each program source. Any number of program sources can be used to obtain video, such as 25 channels, 50 channels, 75 channels, 100 channels, 200 channels, or any other number of program sources. Using the example amount of data, the total data collected during a 24-hour period over three days becomes very large. Therefore, reducing the number of actual reference data point sets is advantageous in reducing the storage load of the matching server 104.

The media client 106 can send a communication 122 to a matching engine 112 of the matching server 104. The communication 122 can include a request for the matching engine 112 to identify unknown content. For example, the unknown content can include one or more unknown data points and the reference database 116 can include a plurality of reference data points. The matching engine 112 can identify the unknown content by matching the unknown data points to reference data in the reference database 116. In some examples, the unknown content can include unknown video data being presented by a display (for video-based ACR), a search query (for a MapReduce system, a Bigtable system, or other data storage system), an unknown image of a face (for facial recognition), an unknown image of a pattern (for pattern recognition), or any other unknown data that can be matched against a database of reference data. The reference data points can be derived from data received from the video data sources 118. For example, data points can be extracted from the information provided from the video data sources 118 and can be indexed and stored in the reference database 116.

The matching engine 112 can send a request to the candidate determination engine 114 to determine candidate data points from the reference database 116. A candidate data point can be a reference data point that is a certain determined distance from the unknown data point. In some examples, a distance between a reference data point and an unknown data point can be determined by comparing one or more pixels (e.g., a single pixel, a value representing group of pixels (e.g., a mean, an average, a median, or other value), or other suitable number of pixels) of the reference data point with one or more pixels of the unknown data point. In some examples, a reference data point can be the certain determined distance from an unknown data point when the pixels at each sample location are within a particular pixel value range.

In one illustrative example, a pixel value of a pixel can include a red value, a green value, and a blue value (in a red-green-blue (RGB) color space). In such an example, a first pixel (or value representing a first group of pixels) can be compared to a second pixel (or value representing a second group of pixels, where the second group of pixels is located in the same display buffer position as the first group of pixels) by comparing the corresponding red values, green values, and blue values respectively, and ensuring that the values are within a certain value range (e.g., within 0-5 values). For example, the first pixel can be matched with the second pixel when (1) a red value of the first pixel is within 5 values in a 0-255 value range (plus or minus) of a red value of the second pixel, (2) a green value of the first pixel is within 5 values in a 0-255 value range (plus or minus) of a green value of the second pixel, and (3) a blue value of the first pixel is within 5 values in a 0-255 value range (plus or minus) of a blue value of the second pixel. In such an example, a candidate data point is a reference data point that is an approximate match to the unknown data point, leading to multiple candidate data points (related to different media segments) being identified for the unknown data point. The candidate determination engine 114 can return the candidate data points to the matching engine 112.

For a candidate data point, the matching engine 112 can add a token into a bin that is associated with the candidate data point and that is assigned to an identified video segment from which the candidate data point is derived. A corresponding token can be added to all bins that correspond to identified candidate data points. As more unknown data points (corresponding to the unknown content being viewed) are received by the matching server 104 from the client device 102, a similar candidate data point determination process can be performed, and tokens can be added to the bins corresponding to identified candidate data points. Only one of the bins corresponds to the segment of the unknown video content being viewed, with the other bins corresponding to candidate data points that are matched due to similar data point values (e.g., having similar pixel color values), but that do not correspond to the actual segment being viewed. The bin for the candidate video content segment that corresponds to the unknown video segment being viewed will have more tokens assigned to it than other bins for segments that do not correspond to the unknown video segment. For example, as more unknown data points are received, a larger number of reference data points that correspond to the bin are identified as candidate data points, leading to more tokens being added to the bin. Once a bin includes a particular number of tokens—that is, the bin reaches a predetermined threshold—the matching engine 112 can determine that the video segment associated with the bin is currently being displayed on the client device 102. A video segment can include an entire video program or a portion of the video program. For example, a video segment can be a video program, a scene of a video program, one or more frames of a video program, or any other portion of a video program.

Figure 2:
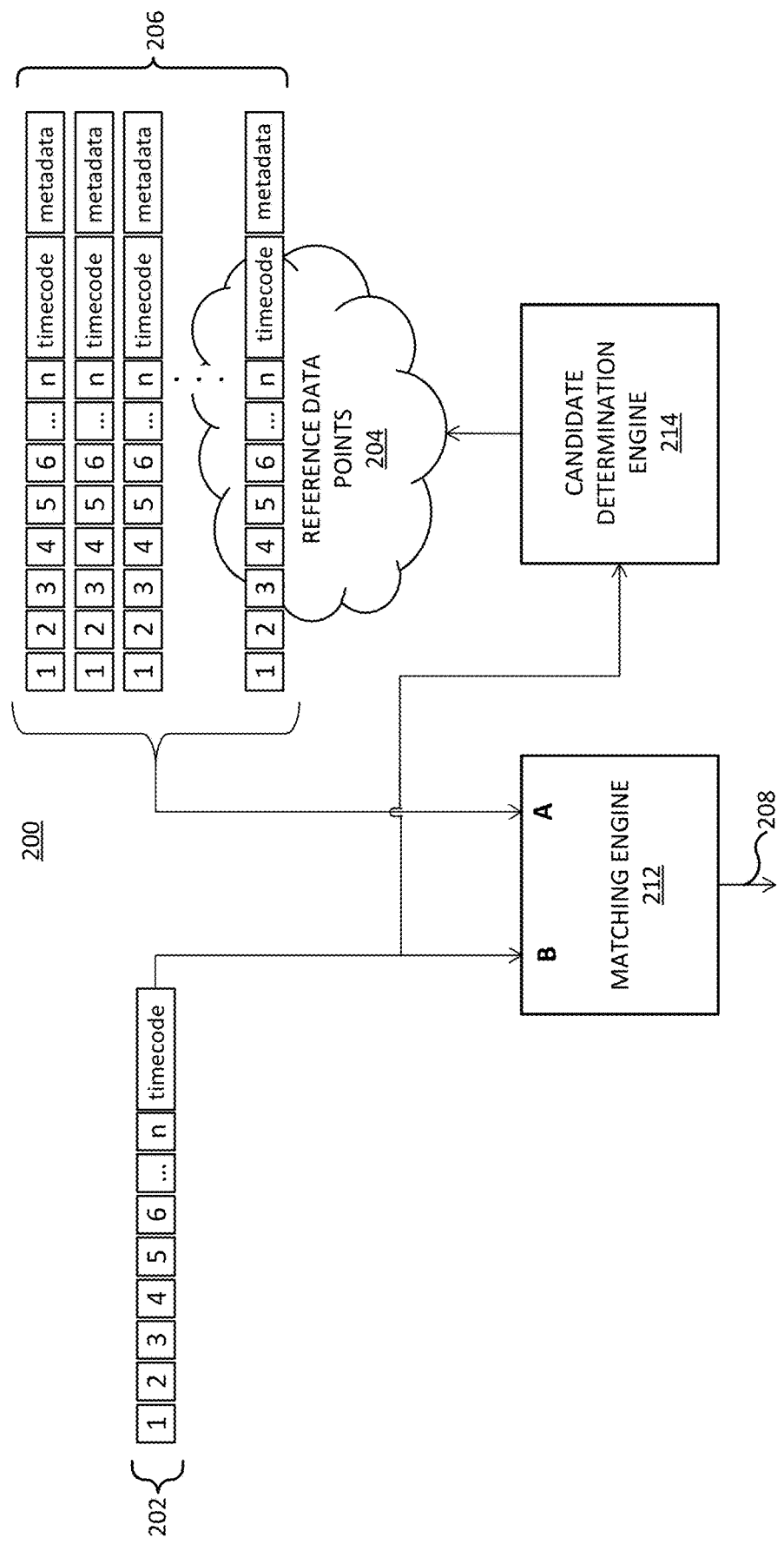
FIG. 2 illustrates components of a matching system for identifying unknown data.

FIG. 2 illustrates components of a matching system 200 for identifying unknown data. For example, the matching engine 212 can perform a matching process for identifying unknown content (e.g., unknown media segments, a search query, an image of a face or a pattern, or the like) using a database of known content (e.g., known media segments, information stored in a database for searching against, known faces or patterns, or the like). For example, the matching engine 212 receives unknown data content 202 (which can be referred to as a "cue") to be matched with a reference data point of the reference data points 204 in a reference database. The unknown data content 202 can also be received by the candidate determination engine 214, or sent to the candidate determination engine 214 from the matching engine 212. The candidate determination engine 214 can conduct a search process to identify candidate data points 206 by searching the reference data points 204 in the reference database. In one example, the search process can include a nearest neighbor search process to produce a set of neighboring values (that are a certain distance from the unknown values of the unknown data content 202). The nearest neighbor search process is discussed in further detail below. The candidate data points 206 are input to the matching engine 212 for conducting the matching process to generate a matching result 208. Depending on the application, the matching result 208 can include video data being presented by a display, a search result, a determined face using facial recognition, a determined pattern using pattern recognition, or any other result.

In determining candidate data points 206 for an unknown data point (e.g., unknown data content 202), the candidate determination engine 214 determines a distance between the unknown data point and the reference data points 204 in the reference database. The reference data points that are a certain distance from the unknown data point are identified as the candidate data points 206. In some examples, a distance between a reference data point and an unknown data point can be determined by comparing one or more pixels of the reference data point with one or more pixels of the unknown data point, as described above with respect to FIG. 1. In some examples, a reference data point can be the certain distance from an unknown data point when the pixels at each sample location are within a particular value range. As described above, a candidate data point is a reference data point that is an approximate match to the unknown data point, and because of the approximate matching, multiple candidate data points (related to different media segments) are identified for the unknown data point. The candidate determination engine 114 can return the candidate data points to the matching engine 112.

Figure 3:
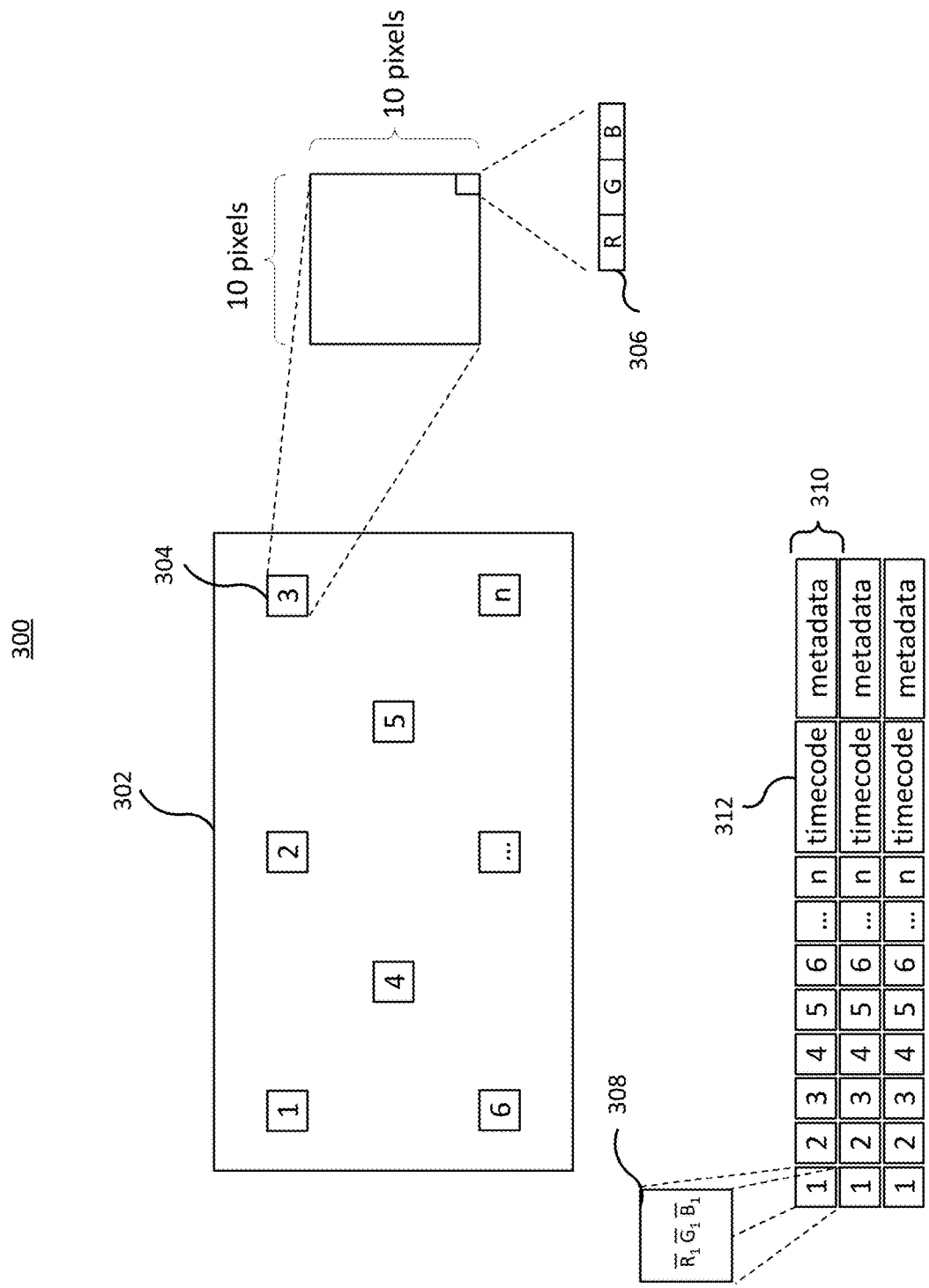
FIG. 3 illustrates an example of a video ingest capture system including a memory buffer 302 of a decoder.

FIG. 3 illustrates an example of a video ingest capture system 400 including a memory buffer 302 of a decoder. The decoder can be part of the matching server 104 or the media client 106. The decoder may not operate with or require a physical television display panel or device. The decoder can decode and, when required, decrypt a digital video program into an uncompressed bitmap representation of a television program. For purposes of building a reference database of reference video data (e.g., reference database 316), the matching server 104 can acquire one or more arrays of video pixels, which are read from the video frame buffer. An array of video pixels is referred to as a video patch. A video patch can be any arbitrary shape or pattern but, for the purposes of this specific example, is described as a 10×10 pixel array, including ten pixels horizontally by ten pixels vertically. Also for the purpose of this example, it is assumed that there are 25 pixel-patch positions extracted from within the video frame buffer that are evenly distributed within the boundaries of the buffer.

An example allocation of pixel patches (e.g., pixel patch 304) is shown in FIG. 3. As noted above, a pixel patch can include an array of pixels, such as a 10×10 array. For example, the pixel patch 304 includes a 10×10 array of pixels. A pixel can include color values, such as a red, a green, and a blue value. For example, a pixel 306 is shown having Red-Green-Blue (RGB) color values. The color values for a pixel can be represented by an eight-bit binary value for each color. Other suitable color values that can be used to represent colors of a pixel include luma and chroma (Y, Cb, Cr, also called YUV) values or any other suitable color values.

A mean value (or an average value in some cases) of each pixel patch is taken, and a resulting data record is created and tagged with a time code (or time stamp). For example, a mean value is found for each 10×10 pixel patch array, in which case twenty-four bits of data per twenty-five display buffer locations are produced for a total of 600 bits of pixel information per frame. In one example, a mean of the pixel patch 304 is calculated, and is shown by pixel patch mean 308. In one illustrative example, the time code can include an "epoch time," which representing the total elapsed time (in fractions of a second) since midnight, Jan. 1, 1970. For example, the pixel patch mean 308 values are assembled with a time code 412. Epoch time is an accepted convention in computing systems, including, for example, Unix-based systems. Information about the video program, known as metadata, is appended to the data record. The metadata can include any information about a program, such as a program identifier, a program time, a program length, or any other information. The data record including the mean value of a pixel patch, the time code, and metadata, forms a "data point" (also referred to as a "cue"). The data point 310 is one example of a reference video data point.

Figure 4:
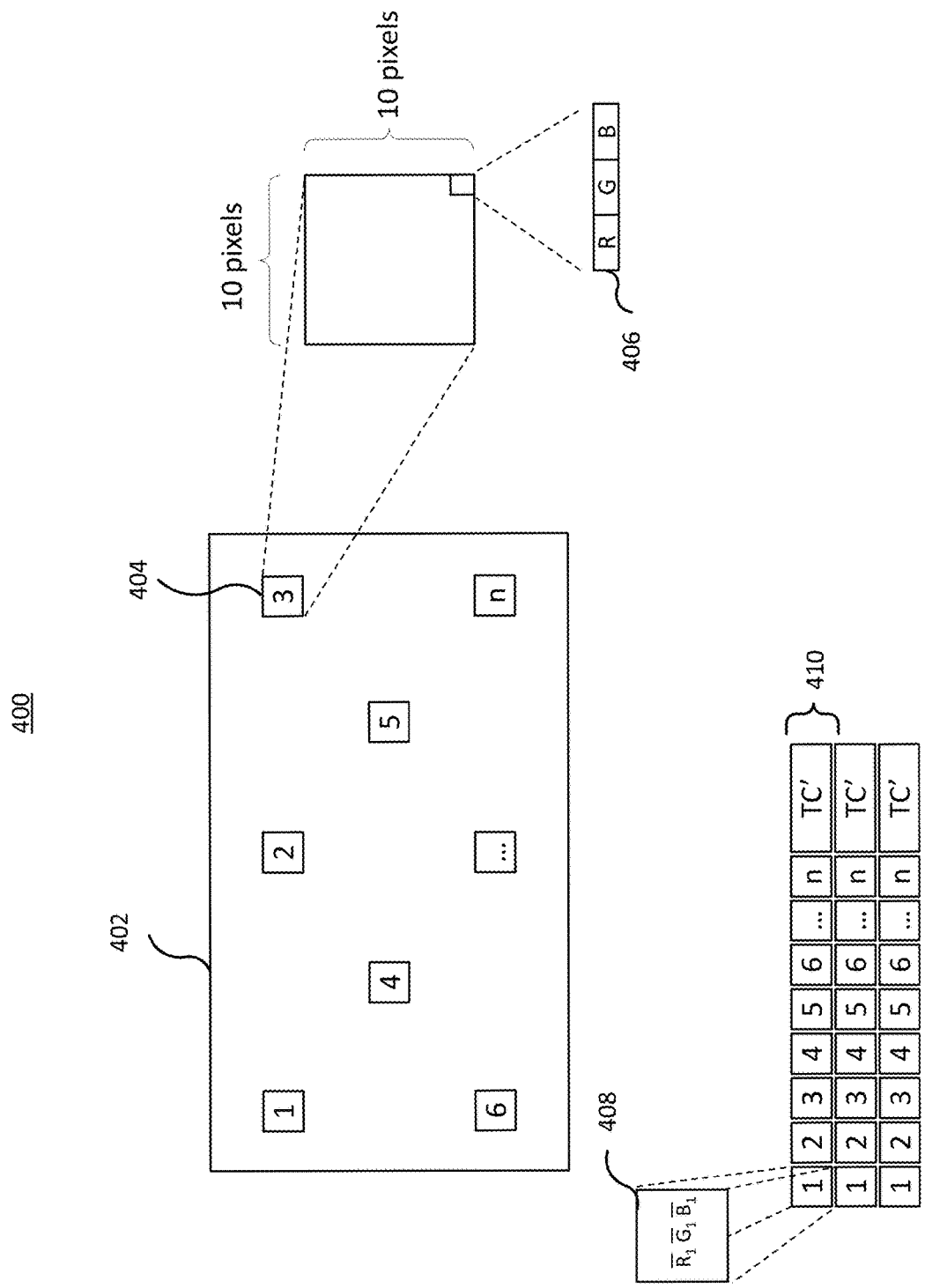
FIG. 4 illustrates a video ingest capture system including a memory buffer of a decoder.

A process of identifying unknown video segments begins with steps similar to creating the reference database. For example, FIG. 4 illustrates a video ingest capture system 400 including a memory buffer 402 of a decoder. The video ingest capture system 400 can be part of the client device 102 that processes data presented by a display (e.g., on an Internet-connected television monitor, such as a smart TV, a mobile device, or other television viewing device). The video ingest capture system 400 can utilize a similar process to generate unknown video data point 410 as that used by system 300 for creating reference video data point 310. In one example, the media client 106 can transmit the unknown video data point 410 to the matching engine 112 to identify a video segment associated with the unknown video data point 410 by the matching server 104.

As shown in FIG. 4, a video patch 404 can include a 10×10 array of pixels. The video patch 404 can be extracted from a video frame being presented by a display. A plurality of such pixel patches can be extracted from the video frame. In one illustrative example, if twenty-five such pixel patches are extracted from the video frame, the result will be a point representing a position in a 75-dimension space. A mean (or average) value can be computed for each color value of the array (e.g., RGB color value, Y, Cr, Cb color values, or the like). A data record (e.g., unknown video data point 410) is formed from the mean pixel values and the current time is appended to the data. One or more unknown video data points can be sent to the matching server 104 to be matched with data from the reference database 116 using the techniques described above.

III. Common Video Segments

Figure 5:
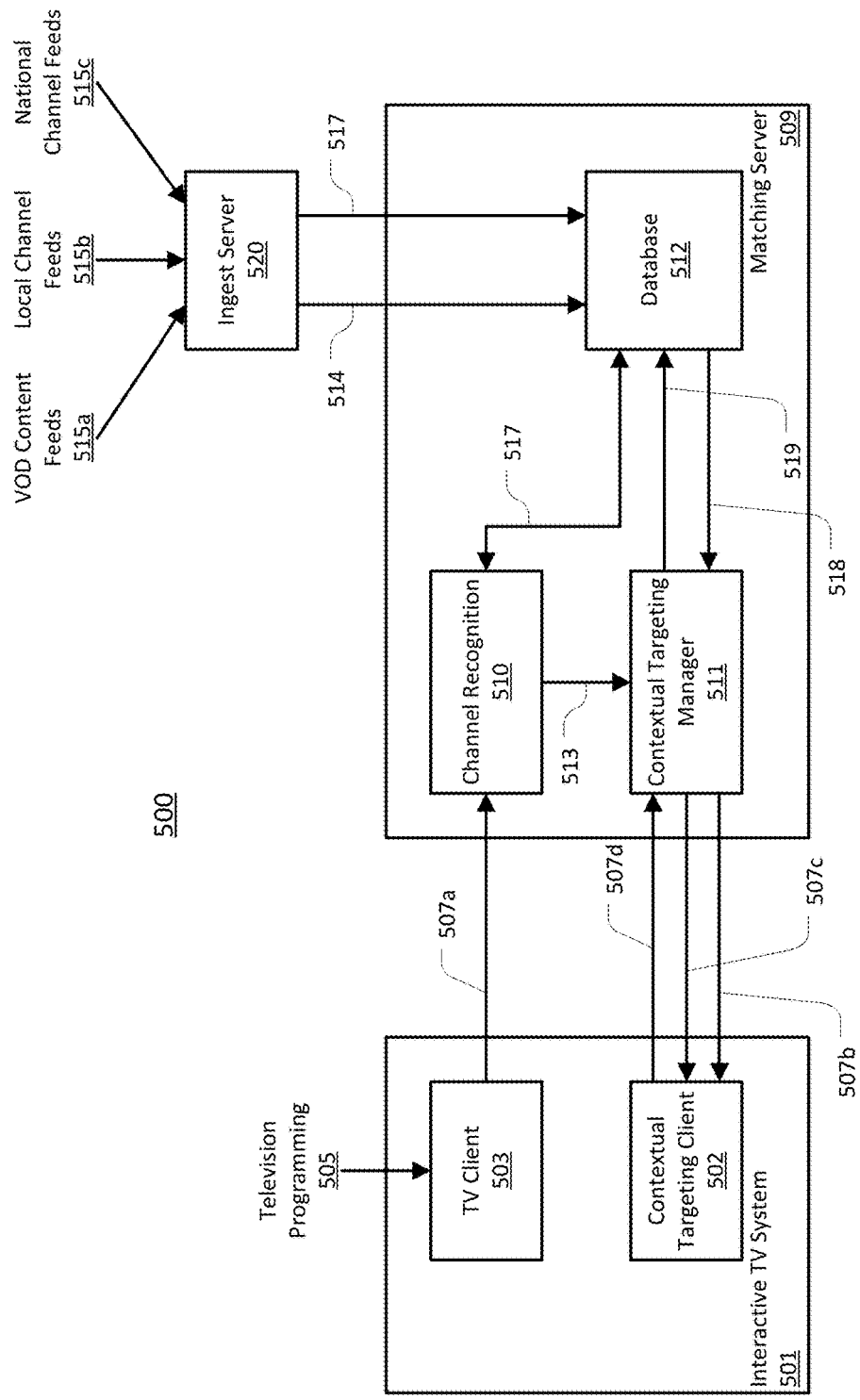
FIG. 5 illustrates an example of a video matching system for an interactive television system.

FIG. 5 illustrates an example of a video matching system 500 for an interactive television (TV) system 501. An interactive television system 501 is given as an example of a media display device. In this example, the interactive television system 501 includes a TV client 503 and a contextual targeting client 502. The TV client 503 may receive television programming 505. The television programming 505 may include audio-video content, which may include audio, video, and/or video data with synchronized audio data. In some cases, the television programming 505 may include metadata. The TV client 503 may be configured to display the audio-video content, including displaying video content on a screen and/or playing audio content through speakers. The television programming 505 may be received from various sources, including broadcast television providers, satellite television providers, Internet media providers, audio-video playing devices (e.g. DVD players, DVR players, VCR players, etc.), and so on.

In various implementations, the video matching system may include a matching server 509. The matching server 509 may recognize media being displayed or played by the interactive television system 501. To provide video matching services, the matching server 509 may receive known media cue data 517 from an ingest server 520. The ingest server 520 may obtain data from various known sources, such as Video-on-Demand (VoD) content feeds 515a, local channel feeds 515b, and national channel feeds 515c. Each of these known sources may provide media data (e.g., video and/or audio) as well as information identifying the media data, such as programming guides or metadata. In various implementations, the ingest server 520 may generate known media cue data 517 from the media data received from the various sources. The ingest server 520 may provide the known media cue data 517 to various recipients, including the matching server 509.

In various implementations, the ingest server 520 may also provide programming identification and time data 514. In various implementations, the programming identification and time data 514 is synchronized with the known media cue data 517, meaning that the programming identification and time data 514 identifies the known media cues 517 and/or provides the times at which the media associated with the known media cues are expected to be displayed. The program identification and time data 514 may also be called metadata.

In various implementations, the known media cue data 517 provide a cue or key for identifying video and/or audio data. The known media cue data 517 may have been taken from known audio-video media, such that the known media cues 517 can be associated with the name and/or some other identification information for the known audio-video media. As described in further detail below, the known media cues 517 can be matched against similar cues taken from media being displayed or played by the interactive television system 501. The matching server 509 may store the known media cue data 517 and the programming identification data 514 in a database 512.

In various implementations, the matching server 509 may include a channel recognition system 510. The channel recognition system 510 may receive unknown media cues 507a from the interactive television system 501. For example, the TV client 503 may take samples from audio-video data being displayed or played at any given time, and may generate cues from the samples. The TV client 503 may provide these cues, as unknown media cues 507a, to the channel recognition system 510 in the matching server 509. The channel recognition system 510 may then match the unknown media cues 507a against known media cues 517 to identify the media being displayed or played by the interactive television system 501.

In various implementations, the channel recognition system 510 determine a program identification for the unknown media cues 507a. The program identification may include a name or description, or some other information that identifies the media content being displayed by the interactive television system 501. The channel recognition system 510 may also provide a time, where the time indicates the time at which the media was played by the interactive television system 501

In various implementations, the channel recognition system 510 may provide the program identification and time data 513 to a contextual targeting manager 511. Using the program identification and time data 513, the contextual manager 511 may determine contextually-related content 507b, including for example applications and advertising. The contextual targeting manager 511 may provide the contextually-related content 507b to the interactive television system 501. For example, the interactive television system 501 may include a contextual targeting engine 502 for managing the contextually-related content 507b. In some implementations, the contextual targeting manager 511 may also provide event triggers 507c to the contextual targeting system 502. The event trigger 507c may instruct the contextual targeting engine 502 to play or display the contextually-related content 507b. For example, an event trigger 507c may instruct the contextual targeting engine 502 to display contextually-related information overlays, where the information overlays are coordinated with the display of video content to which the information overlays are related. Alternatively or additionally, the event triggers 507c may cause substitute media, such as targeted advertising, to be displayed. In some implementations, the contextual targeting engine 502 may provide event confirmation 507d to the contextual targeting manager 511, indicating that the instructions provided by the event trigger 507c has been executed.

In various implementations, the contextual targeting client 502 may alternatively or additionally provide viewership information to the matching server 509. For example, the contextual targeting client 502 may provide viewership information in addition to or instead of event confirmations 507d. In this implementations, the viewership information may include, for example, information about how often a particular media segment was played, what time of day or day of the week the media segment was played, what was played before and/or after the media segment, and/or on what channel the media segment was played. In some cases, the viewership information may also include information about a viewer, such as demographic information.

In various implementations, a media display device may configured with or connected to a video matching system. The video matching system may be able to identify media being displayed or played by the media display device at any given moment in time. As discussed above, the video matching system may take video and/or audio samples for the media being played by the device, generate identifiers or "cues" from the samples, and then match the cues against a database. by identifying the media being displayed or played on a media display device, the video matching system may be able to provide contextually-related content, including applications, advertisements, and/or alternate media content.

When multiple content streams or channels that are available to a media display device play the same content, such as for example "breaking news," the content may not be uniquely identifiable. For example, without additional information, it may not be clear which channel is being displayed by the media display device.

Figure 6:
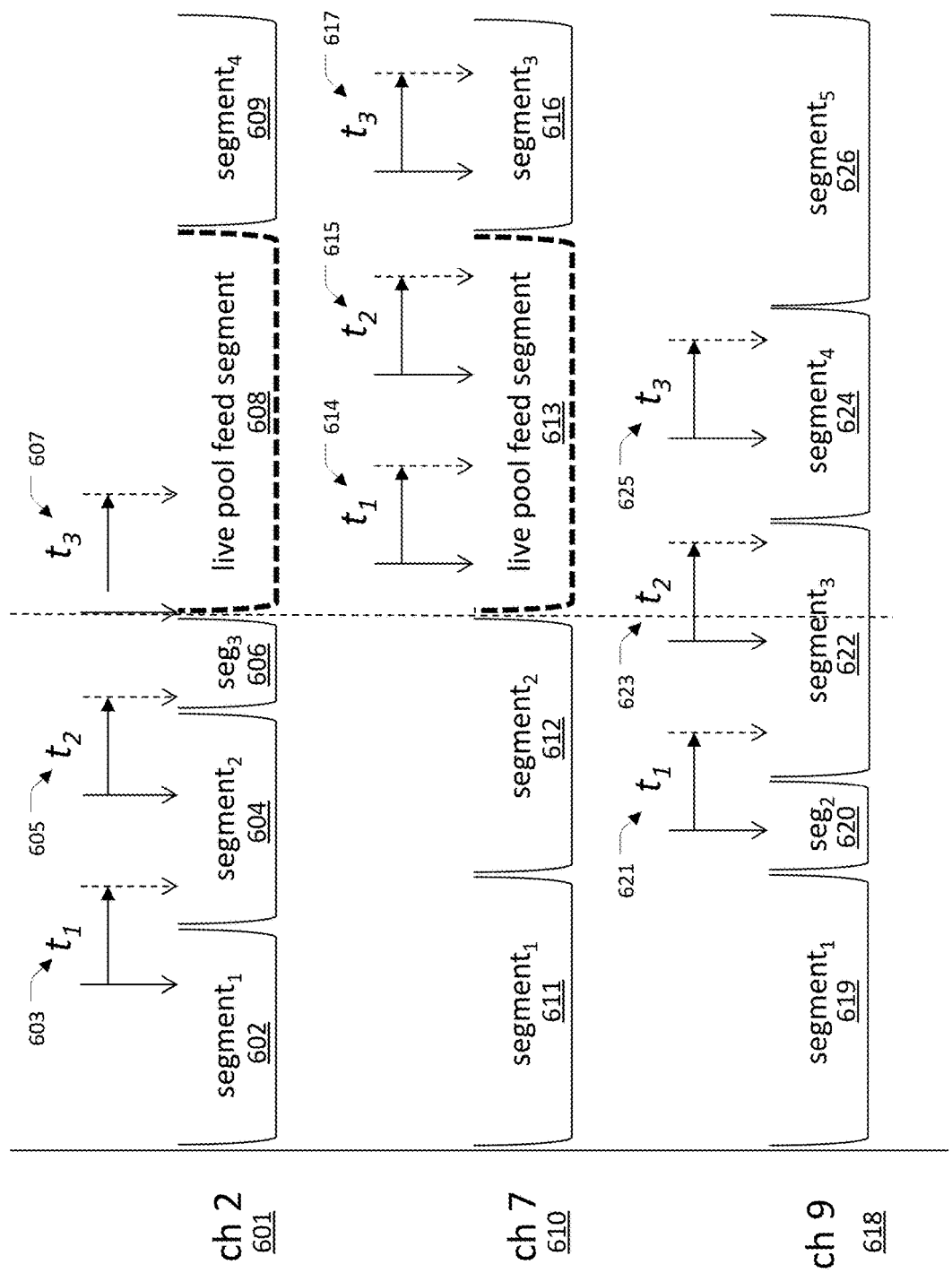
FIG. 6 illustrates an example where multiple content streams are carrying the same media segment at the same time.

FIG. 6 illustrates an example where multiple content streams are carrying the same media segment at the same time. FIG. 6 further illustrates examples of methods by which video matching system can accommodate multiple channels carrying the same media segment. In the illustrated example, three channels are given as examples of the multiple content streams. The three channels could be, for example, three broadcast television channels.

In this example, channel 2 601 plays two segments 602, 604 of regularly scheduled programming. Assuming that a media display device is playing channel 2 601, during two time intervals t1 603 and t2 605, the media display device sends samples from segment 1 602 and segment 2 604 to the video matching system. By the end of time interval t1 603, the video matching system is able to identify segment 1 602, and by the end of time interval t2 605, the video matching system is able to identify segment 2 604.

During a third segment 606, channel 2 601 is interrupted by common media segment, here a live pool feed segment 608. The live pool feed segment 608 of this example is common media segment being provided by, for example, a national broadcaster. The live pool feed segment 608 may be made available to each of its syndicated stations. An example of a live pool feed segment is "breaking news," that is, a national news story. Other example of a live pool feed segments include sporting events, syndicated programs, and commercials. During a time interval t3 607, the media display device may send samples from the live pool feed segment 608 to the video matching system.

The video matching system may determine that the samples provided during time interval t3 607 were for a live pool feed segment 608. In various implementations, the video matching system may make this determination based on finding matching cues for the live pool feed segment that are associated with multiple channels. Upon determining that channel 2 601 is displaying the live pool feed segment 608, in some implementations, the video matching system may treat the live pool segment 608 as a continuation of programming most recently detected on channel 2 601. In these implementations, the video matching system may make this determination based on a low probability that the viewer changed the channel at the exact moment that the live pool feed segment 608 started. In some implementations, the video matching system may further determine that the unexpected live pool feed segment 608 is not likely to be related to any scheduled interactive or targeted content. Hence, in these implementations, the scheduled interactive or targeted content may be suppressed or disabled. The targeted content may not be related to the unscheduled live pool feed segment 608, hence displaying, for example, interactive overlays may not be useful to the viewer.

At the conclusion of the live pool feed segment 608, channel 2 601 may display segment 4 609. In some cases, segment 4 609 may be scheduled programming, meaning that the live pool feed segment 608 has interrupted, or come at the end of, segment 3 606, and is being played instead of whatever was scheduled to follow segment 3 606. For example, segment 4 609 may be a continuation of the program of segment 3 606, picking up at the point in the program where the program would have been if the live pool segment 608 had not played. As another example, segment 4 609 may be a new program that was scheduled to start after segment 3 606. Segment 4 609 may start at the beginning of the new program, or some part of the beginning may have been overridden by the live pool feed segment.

In some cases, rather than overriding programming that would have been displayed between segment 3 606 and segment 4 609, the program of segment 3 606 may instead by suspended. Once the live pool feed segment 608 ends, the program of segment 3 606 may resume in segment 4 609, picking up where the program stopped in segment 3. Alternatively, the program of segment 3 606 may restart in segment 4 609. In some implementations, at the end of the live pool feed segment 608, the viewer may be given the option of resuming the program of segment 3 606 or starting the program over from the beginning.

Another example in FIG. 6 is provided by channel 7 610. On channel 7 610, a segment 1 611 and segment 2 612 are regularly scheduled. Thereafter, channel 7 610 is interrupted by a live pool segment 613. In this example, a media display device may tune into channel 7 610 shortly after the live pool segment 613 starts, or while the live pool segment 613 is airing. During two timer intervals t1 614 and t2 615, the media display device may send samples from the live pool feed segment 613 to the video matching system. The video matching system may subsequently determine that channel 7 610 is playing the live pool feed segment 613. In various implementations, the video matching system may make this determination, for example, based on finding a matching cue for the live pool feed segment 613 that is associated with multiple channels. In this example, the video matching system may not be able to determine which channel the media display device is currently playing. In some implementations, the video matching system may refrain from providing contextually-related content while the live pool feed segment is airing.

At the conclusion of the live pool feed segment 613, channel 7 610 reverts to scheduled programmed with segment 3 616. During a time interval t3 617, the media display device may send samples from segment 3 616 to the video matching system, and at this point, the video matching system may be able to determine that the media display device is tuned to channel 7 610. In some implementations, the video matching system may associate samples taken during time intervals t1 614 and t2 615 with channel 7 610. The video matching system may further provide contextually-related content related to channel 7 610 to the viewer.

A further example is illustrated in FIG. 6 by channel 9 618. In this example, channel 9 618 displays regularly scheduled segment 1 619, segment 2 620, segment 3 622, segment 4 624 and segment 5 626. Assuming that a media display device is tuned into channel 9 618, during time intervals t1 621, t2 623, and t3 625, the media display device sends samples from the segments 620, 622, 624 to a video matching system. In some implementations, the video matching system may determine that channel 9 618 did not include a live pool feed segment. The video matching system may further provide contextually-related content, such as for example replacing commercials with commercials of specific interest to the viewer, where the replacement commercials may be based on information previously collected from the media display device.

Figure 7:
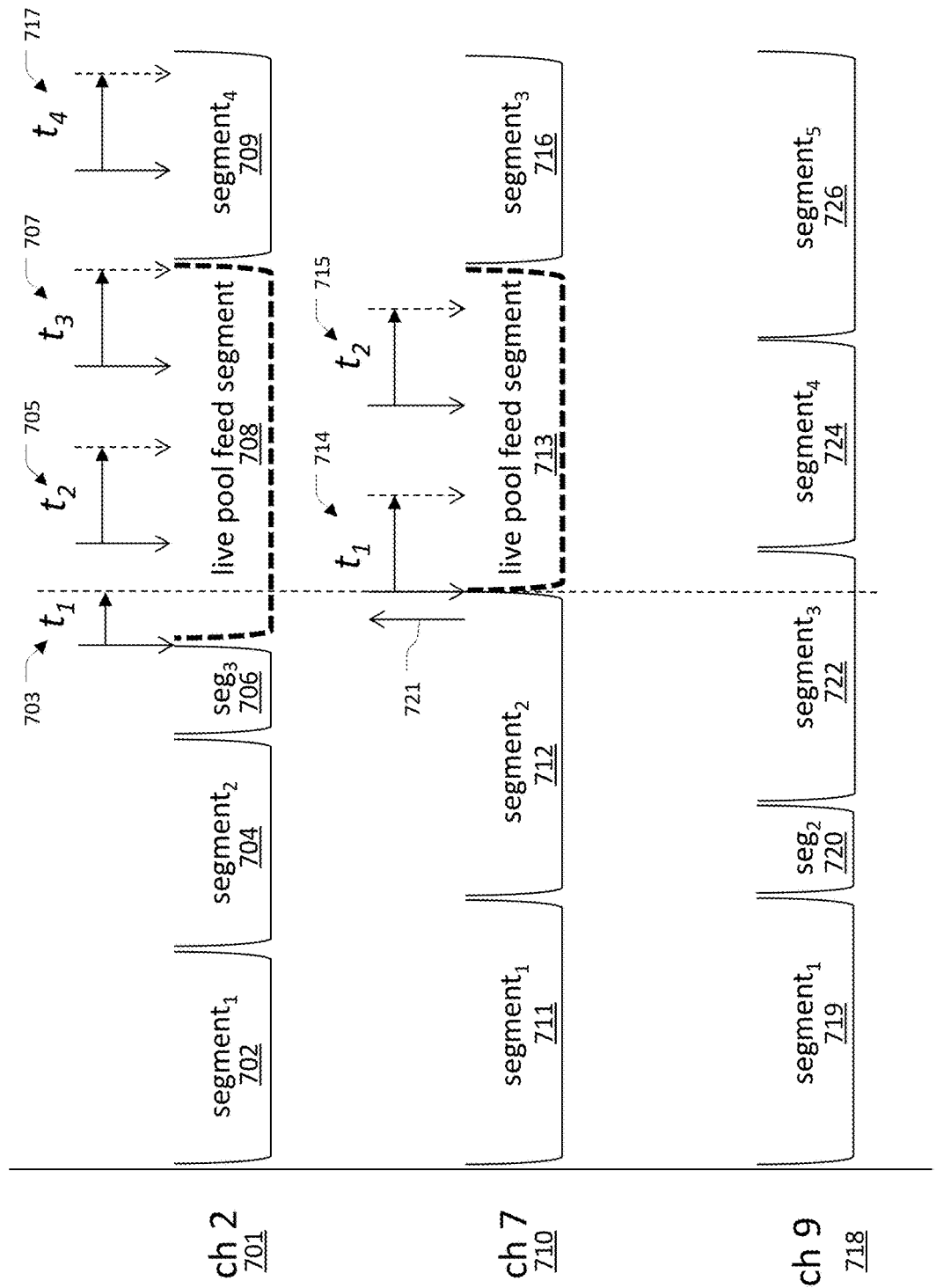
FIG. 7 illustrates another example where multiple media streams, here illustrated as television channels, display the same media content at the same time.

In some situations, a channel may start displaying a common pool feed after the common pool feed segment has started. FIG. 7 illustrates another example where multiple media streams, here illustrated as television channels, display the same media content at the same time. In this example, channel 2 701 displays regularly scheduled segment 1 702, segment 2 704, and segment 3 706 before switching to a live pool feed segment 708. Should a media display device be tune into channel 2 701 at about the time the live pool feed segment 708 starts, the media display device may send samples during time intervals t1 703, t2 705, t3 707, and t4 717 during a subsequent segment 4 709 to a video matching system. As discussed above, the video matching system may determine that the media display device is tuned into channel 2 701 upon receiving the samples from segment 4 709.

Channel 7 710 of this example displays regularly scheduled segment 1 711 and segment 2 712. Though the live pool feed segment 713 starts at point in time 721, channel 7 710 delays switching to the live pool feed segment 713. This delay may be because, for example, segment 2 712 ran overtime, because the programmers of channel 7 710 determined to allow segment 2 712 to finish, and/or because segment 2 712 included an introduction to the live pool feed segment 713. Assuming a media display device tuned into channel 7 710 at around time 721, the media display device may send samples during time intervals t1 714 and t2 715 to a video matching system. The video matching system may determine that channel 7 710 is playing the live pool feed segment 713, but may not be able to determine which channel the media display device is playing.

In another example scenario, a media display device may initially be tuned into channel 7 1310, and then at time 721 switch to channel 2 701. At time 721, channel 2 701 may already be playing the live pool feed segment 708. Because the live pool feed segment 708 is associated with multiple channels, during the time intervals t2 705 and t3 707, the video matching system may not be able to determine which channel the media display device has changed to. Once segment 4 709 displays, the video matching device can determine that the media display device is tuned into channel 2 701. Upon making this determination, the video matching system may associate samples from t2 705 and t3 707 with channel 2 701.

Figure 8:
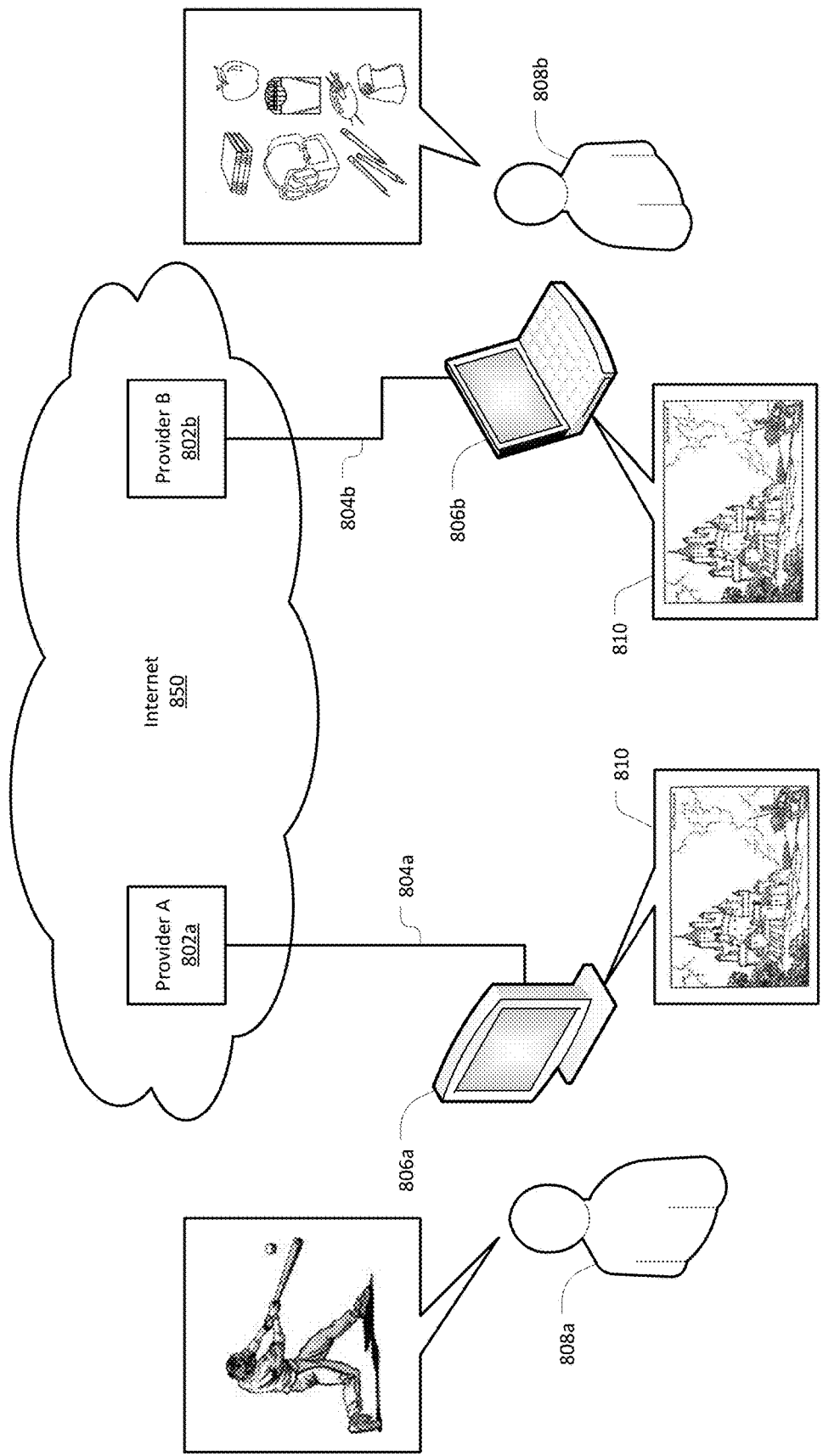
FIG. 8 illustrates an example where multiple media content streams are carrying the same, common media segment at approximately the same time.

FIG. 8 illustrates an example where multiple media content streams are carrying the same, common media segment 810 at approximately the same time. In this example, two media content streams 804a, 804b are being delivered to two different media display devices 806a, 806b. In other examples, many different media content streams, each carrying the same media content, may be being delivered to many different media display devices at the same time. In this example, the two media display devices 806a, 806b may be, for example, in the same household, being used by two different people 808a, 808b in the same family. For example, one family member 808a may be watching television programs on a TV 806a in the living room, while another family member 808b is watching television programs on a laptop in the study. Alternatively, the two media display devices 806a, 806b and the people using them 808a, 808b may be unrelated and in different locations.

At around the same time, the two people 808a, 808b maybe tune their display devices 806a, 806b into the same media segment 810. For example, the two people 808a, 808b may individually decide to watch the same movie. As a result, the two media display devices 806a, 806b may be displaying exactly the same media segment 810 at a given moment. Alternatively, at a given moment there may be a time of difference of a few seconds or a few minutes between the content being displayed by each device 806a, 806b. For example, the TV 806a may be a few seconds ahead of the laptop 806b in the movie.

In this example, the media content streams 804a, 804b are digital audio-video streams and/or audio streams being delivered over the Internet 850. For example, the media content streams may include movies, television shows, music, text, and/or images being provided by a website. The media content streams 804a, 804b may each be provided by different content providers, Provider A 802a and Provider B 802b. Providers A 802a and B 802b may be, for example, Internet movie, music, and/or television providers. Alternatively, in some cases, Provider A 802a and Provider B 802b may be the same content provider.

In the example of FIG. 8, both of the media display devices 806a, 806b may be connected to a computing device (not illustrated) that is configured with a video matching system. The video matching system may attempt to identify media content being played by each of the devices 806a, 806b, using cues taken from the media content being played, while it is being played. The video matching system may match these cues against a database, and from the database determine information such as the title of the media content being played, identities of the creator, producer, and/or distributor of the media content, an identity of the person who is viewing the media content, and/or an identity of the viewer's device. For example, in this example, the video matching system may be able to obtain the identity of Provider A 802a by examining the media content stream 804a. As another example, the video matching system may be able to distinguish the TV 806a from a smartphone owned by the same person 808a. Additionally, the video matching system may be able to determine that the person's 808a TV 806a and smartphone are located in different places. The video matching system may further use this information to provide contextually-related content, such as interactive information and/or advertising, to the media display device, which may display the contextually-related content to the viewer.

As discussed above, when the two example media content streams 804a, 804b are displaying the same media segment 810 at about the same time, the video matching system may not be able to determine some information. For example, while the video matching system may be able to identify the TV 806a and the laptop 806b that are playing the common media segment 810, this information alone may not be enough for the video matching system to determine contextually-related content that is specific to each device. For example, should the video matching system be provided with information such as characteristics or an identity of the individual people 808a, 808b watching the two devices, the video matching system may be able to tailor contextually-related content for the first person 808a while providing different contextually-related content for the second person 808b.

To determine contextually-related content, the video matching system may use the methods discussed above with respect to FIGS. 6 and 7. In various implementations, the video matching system may determine identification information for other media content included in the media content streams 804a, 804b of FIG. 8. For example, in one case, the person 808a viewing the TV 806a may have been watching sports news prior to tuning into the common media segment 810. The video matching system may use the identification information for this prior media content to identify the media content stream 804a. For example, the video matching system may be able to identify the media content stream 804a as being associated with the TV 806a and/or the person 808a watching the TV 806a. The video matching system may further be able to provide contextually-related content to the TV 806a. For example, the video matching system may provide news for the person's 808a favorite team and/or advertising for sporting events or sporting equipment.

As another example, the person 808b watching the laptop 806b may not have been using the laptop 806b to view media content prior to tuning into the common media segment 810. Instead, this person 808b may, either in the middle of the common media segment 810 or after, view other media content. For example, during a commercial break in the common media segment 810, the person 808b may use the laptop 806b to shop for school supplies. The video matching system may use this other media content, displayed in the middle of or after the common media segment 810, to identify the media content stream 804b. For example, the video matching system may identify the media content stream as associated with the laptop 806b and/or the person 808b using the laptop 806b. The video matching system may further provide contextually-related content to the laptop 806b. For example, the video matching system may provide advertising related to school supplies, suggestions for where to shop, and/or suggestions for where to find sales.

Figure 9:
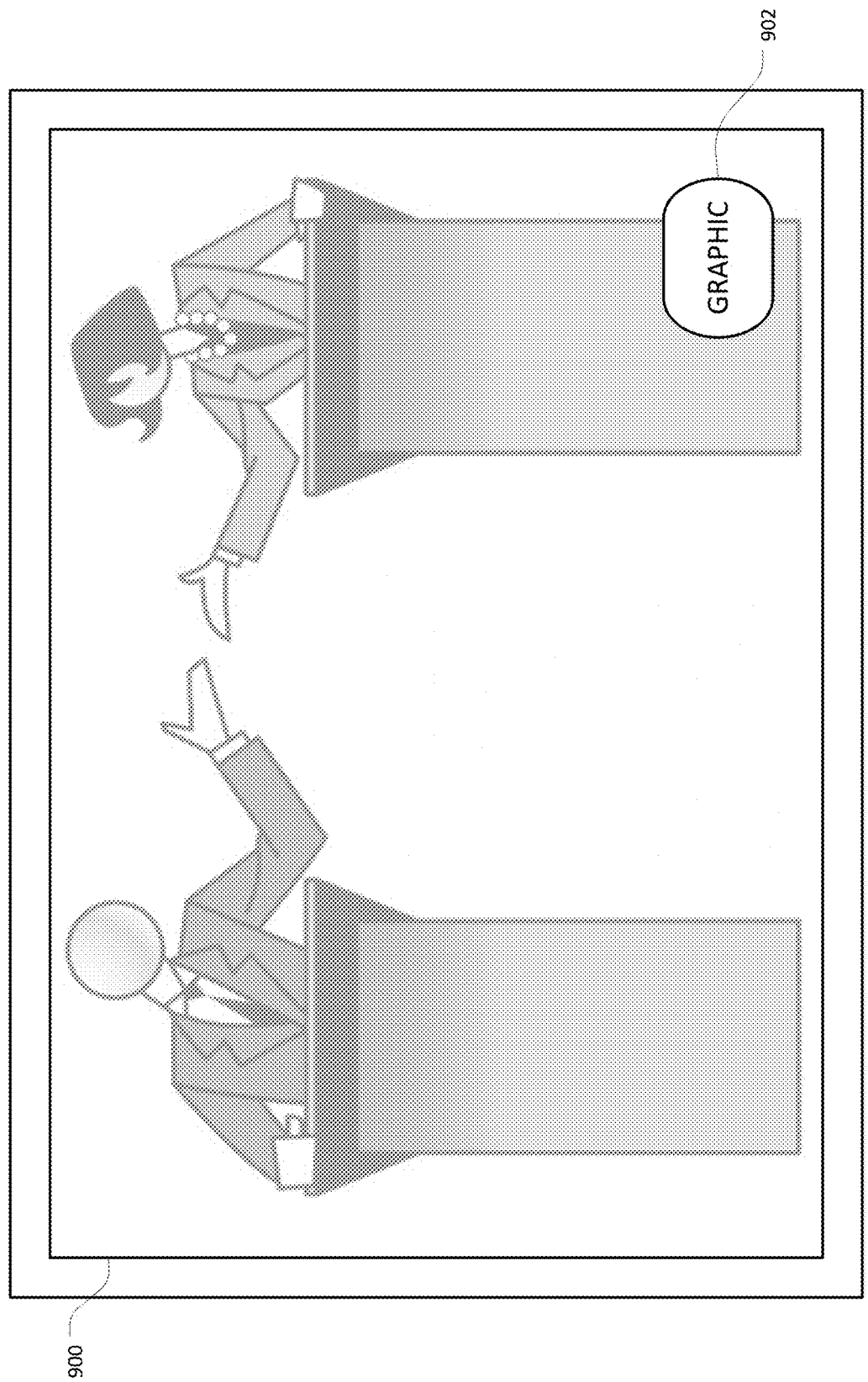
FIG. 9 illustrates one example of a graphic that has been superimposed onto a common media segment being played by a media display device.

In various implementations, a video matching system may use other methods to identify a media content stream when the media content stream is playing a common media segment. In some cases, the provider of the media content stream may provide a graphic element, superimposed onto the common media segment. FIG. 9 illustrates one example of a graphic 902 that has been superimposed onto a common media segment being played by a media display device 900. In various implementations, the graphic 902 may be used by a content provider to identify the content provider, particularly when multiple content providers are playing a common media segment. For example, multiple local television channels may be showing the same national news segment at the same time. The local broadcaster may add a graphic 902 to the news segment, to identify itself. The graphic 902 may be, for example, a logo, program information, or other information.

FIG. 9 illustrates one example of the size and location of a graphic that may be used be some content providers. In other examples, the graphic 902 may be in the shape of a banner or ticker across the bottom or top of the screen, a column on the left or right of the screen, or may appear superimposed over the center of the screen.

In various implementations, a method for detecting a graphic overlay may examine the video display, and find video image edges. Video image edges can be detecting by looking for high contrast differences between sections of a screen of a media display device. The method may further include monitoring whether the detected edges remain stationary. When the detected edges remain in particular locations for longer than a short duration, the video matching systems may determine that it has found an on-screen graphic. For example, the video matching system may look for high-contrast difference across the bottom area of the screen, which may indicate the presence of an on-screen banner.

In various implementations, the video matching system described above can include methods for detecting a graphic overlay. For example, as discussed above, pixel patches can defined for the screen of a media display device. A "pixel patch" may be defined as a block of pixels that are sampled from the screen of a media display device. A pixel patch may contain some number of pixels, each of which can have, for example, RGB color values (or YUV or color values expressed in some other format). For the purposes of graphics overlay detection, the pixel patches may be, for example, 32 pixels wide by 32 pixels high, or a multiple of 32 pixels, such as 64 pixels wide by 64 pixels high. These example sizes may take advantage of the discrete cosine transform (DCT). A discrete cosine transform function can be performed by the video matching system. Edges of a graphic overlay can be detected by examining the coefficients in the lower right quadrant of the discrete cosine transform for each pixel patch In various implementations, the detection process could also include detecting, over a predetermined length of time, whether high-frequency information from the discrete cosine transform is unchanged. When the high-frequency information does not change, a graphic overlay may be present. In these implementations, some onscreen graphics, such as scrolling banners, can be identified.

In various implementations, other onscreen graphic detection methods can use algorithms such as Sobel and Sharr, or can use an algorithm from the perceptual hashing family of image analysis. As with discrete cosine transform, these algorithms can also be used to detect edges, as well as corners, of graphical elements within video signals. In some cases, a pixel patch with an odd number of pixels, such as 3 pixels by 3 pixels, may be used in a convolution-coded stepwise sweep over a video area of interest, to search for edges.

In various implementations, detecting an onscreen graphic may begin with reducing the pixel information in a pixel patch from an 8-bit Red-Green-Blue (RGB) value an 8-bit monochrome value. Next, a Gaussian blur may be applied to reduce noise in the video information. Next the pixel matrix (that is, the resulting pixel patch) may be passed over the video area of interest. This matrix can then be used to calculate a first-order differential of the pixel values relative to either the vertical or horizontal axis of the video screen. The computed differential is left behind in the respective pixel locations. This differential can be examined for maximum values, which may indicate edges.

In various implementations, another method for detecting graphics overlays is to train the video matching system with various graphics that can be used for graphic overlays. An image matching algorithm can then be used to match the trained or learned graphics to the pixels on the screen. For example, the video matching system can use a perceptual hash (pHash) approach to perform the matching. Examples of other frame comparison methods include the Scale-invariant feature transform (SIFT) and Speeded Up Robust Features (SURF). In implementations where pHash is used, entire video frames can be quickly processed. The resulting hash values may be compared to reference video images. These reference video images may also processed using pHash, and may be supplied from a central server. One of the advantages of using pHash is that it may be able to reliably match coarse features (e.g. large rectangles or other shapes that may be used by graphic overlays) with relatively high insensitivity to contrast, brightness, or color changes. Another advantage of pHash is its ability to also match detailed individual video frames.

In various implementations, the video matching system may further maintain a library of different possible graphics overlay comparison candidates. Furthermore, the video matching system may use the library without increasing the total number of total image searches that are conducted within a unit of time. Specifically, in some implementations, the video matching system may track successful detections. Graphics overlay comparison candidates that match successfully and frequently may be more likely to match in the future, while candidates that match infrequently or that have not successfully matched are less likely to match in the future.

In various implementations, graphics overlay detection can be interleaved with processes for automated content recognition.

Figure 10:
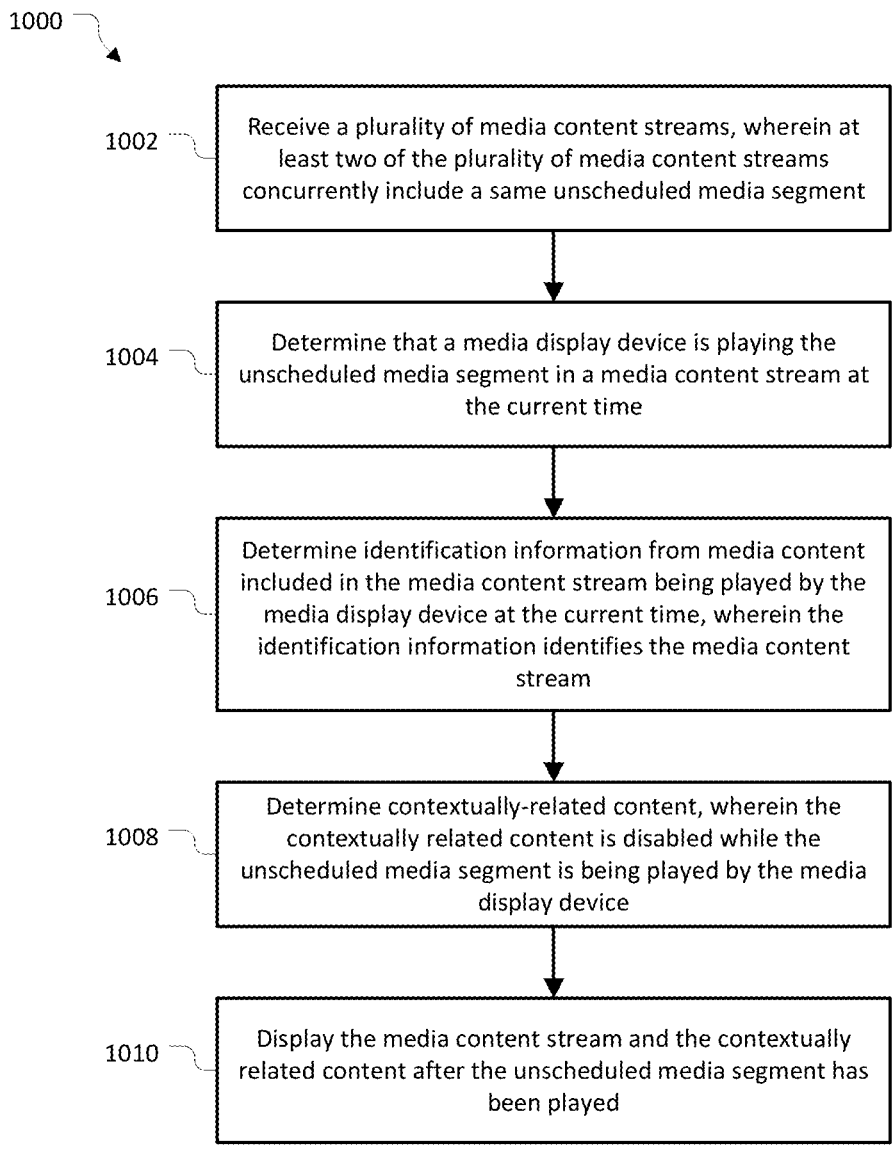
FIG. 10 illustrates an example of a process that may be implemented when multiple media content streams include a same unscheduled media segment.

FIG. 10 illustrates an example of a process 1000 that may be implemented when multiple media content streams include a same unscheduled media segment. The process 1000 may be implemented by a computing device, where the computing device has been configured with a video matching system such as is described above.

At step 1002, the computing device may receive a plurality of media content streams. The computing device may be configured to identify media content being played by a particular media display device (e.g., a television, a tablet computer, a laptop, etc.) at a particular time. At least two of the plurality of media content streams may concurrently include a same unscheduled segment. For example, two media content streams may both include a "breaking news" segment, that is, a national broadcast of a significant event. As another example, to media content streams may both include the same streaming movie, where the movie was requested by different people using different media display devices. In this example, the media segment is "unscheduled" because there may not be a schedule of programming associated with the media display devices.

At step 1004, the computing device may determine that the particular media display device is playing the unscheduled media segment in a media content stream at a current time. The computing device may make this determining by examining the media content available at the current time in each of the plurality of media content streams. For example, the plurality of media content streams may include two or more local televisions channels, and two or more of these local television channels may both be receiving a breaking news feed.

At step 1006, the computing device may determine identification information from the media content included in the media content stream being played by the particular media display device at the current time. For example, the computing device may use identification information provided by media content that was played by the particular media display device before the unscheduled media segment. Alternatively or additionally, the computing device may use identification information provided by media content that is played after the unscheduled media segment. The identification information may identify the media content stream. For example, the identification information may identify a channel, a service provider, the particular media display device, and/or the person using the particular media display device.

At step 1008, the computing device may determine contextually-related content. Contextually-related content may include, for example, interactive information, advertisements, and/or suggestions for additional content, among other things. The contextually-related content may be disabled while the unscheduled media segment is being played by the particular media display device.

At step 1010, the computing device may display the media content stream and the contextually-related content after the unscheduled media segment has been played. For example, the computing device may overlay the contextually-related information over media content that follows the unscheduled media segment. Alternatively or additionally, the computing device may insert the contextually-related information after the unscheduled media segment and before additional media content is played.

Various methods related to matching cues from unknown media content to candidates in a reference database will now be discussed in greater detail. These methods include the nearest neighbor search process discussed above with respect to FIG. 2.

As discussed above, a video matching system can be configured to identify a media content stream when the media content stream includes an unscheduled media segment. As further discussed above, identifying the media content stream may include identifying media content played by a media display device before or after the unscheduled media segment. Processes for identifying media content are discussed above with respect to FIG. 1. Specifically, the video content system may use samples taken from the display mechanism of the media content device (e.g., graphic and/or audio samples) and generate cues from these samples. The video matching system may then match the cues against a reference database, where the database contains cues for known media content.

The video matching system may further include various methods to improve the efficiency of finding matches in the database. The database may contain an enormous number of cues, and thus the video matching system may include algorithms for finding potential matches, or "candidates" to match against. The video matching system may further include algorithms to determine which candidate cues actually match cues generated from the media content device's display mechanism. Locating candidate cues may be more efficient than other methods for matching cue values against the values in the database, such as matching a cue against every entry in the database.

Nearest neighbor and path pursuit are examples of techniques that can be used to match unknown cues to candidate cues in the reference database. Path pursuit is a mathematical method for identifying a related sequence of points from among many possible points. Nearest neighbor is a method that can be used to identify candidate points for conducting a path pursuit. Below, an example applying path nearest neighbor and path pursuit to tracking video transmission using ambiguous cues is given, but the general concept can be applied to any field where match candidates are to be selected from a reference database.

A method for efficient video pursuit is presented. Video pursuit is the application path pursuit techniques to the problem of locating matching candidates in a video reference database given unknown video cues. Given a large number of video segments, the system must be able to identify in real time what segment a given query video input is taken from and in what time offset. The segment and offset together are referred to as the location. The method is called video pursuit since it must be able to efficiently detect and adapt to pausing, fast forwarding, rewinding, abrupt switching to other segments, and switching to unknown segments. Before being able to pursue live video the database is processed. Visual cues (a handful of pixel values) are taken from frames every constant fraction of a second and put in specialized data structure (note that this can also be done in real time). The video pursuit is performed by continuously receiving cues from the input video and updating a set of beliefs or estimates about its current location. Each cue either agrees or disagrees with the estimates, and they are adjusted to reflect the new evidence. A video location is assumed to be the correct one if the confidence in this being true is high enough. By tracking only a small set of possible "suspect" locations, this can be done efficiently.

A method is described for video pursuit but uses mathematical constructs to explain and investigate it. It is the aim of this introduction to give the reader the necessary tools to translate between the two domains. A video signal is comprised of sequential frames. Each can be thought of as a still image. Every frame is a raster of pixels. Each pixel is made out of three intensity values corresponding to the red, green, and blue (RGB) make of that pixel's color. In the terminology used herein, a cue is a list of RGB values of a subset of the pixels in a frame and a corresponding time stamp. The number of pixels in a cue is significantly smaller than in a frame, usually between 5 and 15. Being an ordered list of scalar values, the cue values are in fact a vector. This vector is also referred to as a point.

Although these points are in high dimension, usually between 15 and 150, they can be imagined as points in two dimensions. In fact, the illustrations will be given as two dimensional plots. Now, consider the progression of a video and its corresponding cue points. Usually a small change in time produces a small change in pixel values. The pixel point can be viewed as "moving" a little between frames. Following these tiny movements from frame to frame, the cue follows a path in space like a bead would on a bent wire.

In the language of this analogy, in video pursuit the locations of the bead in space (the cue points) are received and the part of wire (path) the bead is following is looked for. This is made significantly harder by two facts. First, the bead does not follow the wire exactly but rather keeps some varying unknown distance from it. Second, the wires are all tangled together. These statements are made exact in section 2. The algorithm described below does this in two conceptual steps. When a cue is received, the algorithm looks for all points on all the known paths that are sufficiently close to the cue point; these are called suspects. This is done efficiently using the Probabilistic Point Location in Equal Balls algorithm. These suspects are added to a history data structure and the probability of each of them indicating the true location is calculated. This step also includes removing suspect locations that are sufficiently unlikely. This history update process ensures that on the one hand only a small history is kept but on the other hand no probable locations are ever deleted. The generic algorithm is given in Algorithm 1 and illustrated in FIG. 11.

---
Algorithm 1 Generic path pursuit algorithm.
---
1:   Set of suspects is empty
2:   loop
3:      Receive latest cue.
4:      Find path points who are close to it.
5:      Add them to the set of suspects.
6:      Based on the suspects update the location likelihood function.
7:      Remove from suspect set those who do not contribute to the likelihood function.
8:      if A location is significantly likely then
9:         Output the likely location.
10:     end if
11:   end loop

---

The following sections begin with describing the Probabilistic Point Location in Equal Balls (PPLEB) algorithm in Section 1. the PPLEB algorithm is used in order to perform line 5 in Algorithm 1 above efficiently. The ability to perform this search for suspects quickly is crucial for the applicability of this method. In section 2 one possible statistical model is described for performing lines 6 and 7. The described model is a natural choice for the setup. It is also shown how it can be used very efficiently.

Section 1—Probabilistic Point Location in Equal Balls

The following section describes a simple algorithm for performing probabilistic point location in equal balls (PPLEB). In the traditional PLEB (point location in equal balls), one starts with a set of n points $x_i$ in $\mathbb{R}^d$ and a specified ball of radius r. The algorithm is given O(poly(n)) preprocessing time to produce an efficient data structure. Then, given a query point x the algorithm is required to return all points $x_i$ such that $\|x-x_i\| \leq r$. The set of points such that $\|x-x_i\| \leq r$ geometrically lie within a ball of radius r surrounding the query x (see FIG. 12). This relation is referred to as $x_i$ being close to x or as $x_i$ and x being neighbors.

The problem of PPLEB and the problem of nearest neighbor search are two similar problems that received much attention in the academic community. In fact, these problems were among the first studied in the field of computational geometry. Many different methods cater to the case where the ambient dimension is small or constant. These partition the space in different ways and recursively search through the parts. These methods include KD-trees, cover-trees, and others. Although very efficient in low dimension, when the ambient dimension is high, they tend to perform very poorly. This is known as the "curse of dimensionality". Various approaches attempt to solve this problem while overcoming the curse of dimensionality. The algorithm used herein uses a simpler and faster version of the algorithm and can rely on Local Sensitive Hashing.

Section 1.1 Locality Sensitive Hashing

In the scheme of local sensitive hashing, one devises a family of hash functions H such that:

$$\Pr_{u \sim U}(u(x) \neq u(y) \mid \|x-y\| \leq r) \equiv p$$

$$\Pr_{u \sim U}(u(x) \neq u(y) \mid \|x-y\| \geq 2r) \geq 2p$$

In words, the probability of x and y being mapped to the same value by h is significantly higher if they are close to each other.

For the sake of clarity, let us first deal with a simplified scenario where all incoming vectors are of the same length r' and $r' > \sqrt{2r}$. The reason for the latter condition will become clear later. First a random function $u \in U$ is defined, which separates between x and y according to the angle between them. Let $\vec{u}$ be a random vector chosen uniformly from the unit sphere $S^{d-1}$ and let $u(x) = \text{sign}(\vec{u} \cdot x)$ (See FIG. 13). It is easy to verify that $\Pr_{u \sim U}(u(x) \neq u(y)) = 0_{x,y}/\pi$. Moreover, for any points x, y, x', y' on a circle such that $$\Pr_{u \sim U}(u(x) \neq u(y) \mid \|x-y\| \leq r) \equiv p$$

$$\Pr_{u \sim U}(u(x) \neq u(y) \mid \|x-y\| \geq 2r) \geq 2p$$

The family of functions H is set to be a cross product of t independent copies of u, i.e. $h(x) = [u_1(x), \ldots, u_t(x)]$.

Intuitively, one would like to have that if h(x)=h(y) then x and y are likely to be close to each other. Let us quantify that. First, compute the expected number of false positive mistakes $n_{fp}$. These are the cases for which h(x)=h(y) but ‖x−y‖>2r. A value t is found for which $n_{fp}$ is no more than 1, i.e. one is not expected to be wrong.

$$E[n_{fi}] \le n(1-2p)^t \le 1 \to t \ge \log(1/n)/\log(1-2p)$$

Now, the probability that h(x)=h(y) given that they are neighbors is computed:

$$Pr(h(x) = h(y) \mid \|x-y\| \le r) \ge (1-p)^{\log(1/n)/\log(1-2p)} = (1/n)^{\log(1-p)/\log(1-2p)} \ge 1/\sqrt{n}.$$

Note here that one must have that 2p<1 which requires r'> $\sqrt{2}$r. This might not sound like a very high success probability. Indeed, 1/√n is significantly smaller than ½. The next section will describe how to boost this probability up to ½.

Section 1.2 the Point Search Algorithm function h maps every point in space to a bucket. Define the bucket function $B_h$: $\mathbb{R}^d \to 2^{[n]}$ of a point x with respect to hash function h as $B_h(x) \equiv \{x_i | h(x_i) = h(x)\}$. The data structure maintained is m=O(√n) instances of bucket functions [$Bh_1$, ..., $Bh_m$]. When one searches for a point x, the function returns B(x)=∪i$B_{h_j}$(x). According to the previous section, there are two desired results:

$$Pr(x_i \in B(x) \mid \|x_i - x\| \le r) \ge 1/2$$

$$E[|B(x) \cap \{x_i \mid \|x-x_i\| > 2r\}|] \le \sqrt{n}.$$

In other words, while with probability at least ½ A each neighbor of x is found, one is not likely to find many non-neighbors.

Section 1.3 Dealing with Different Radii Input Vectors

Figure 14:
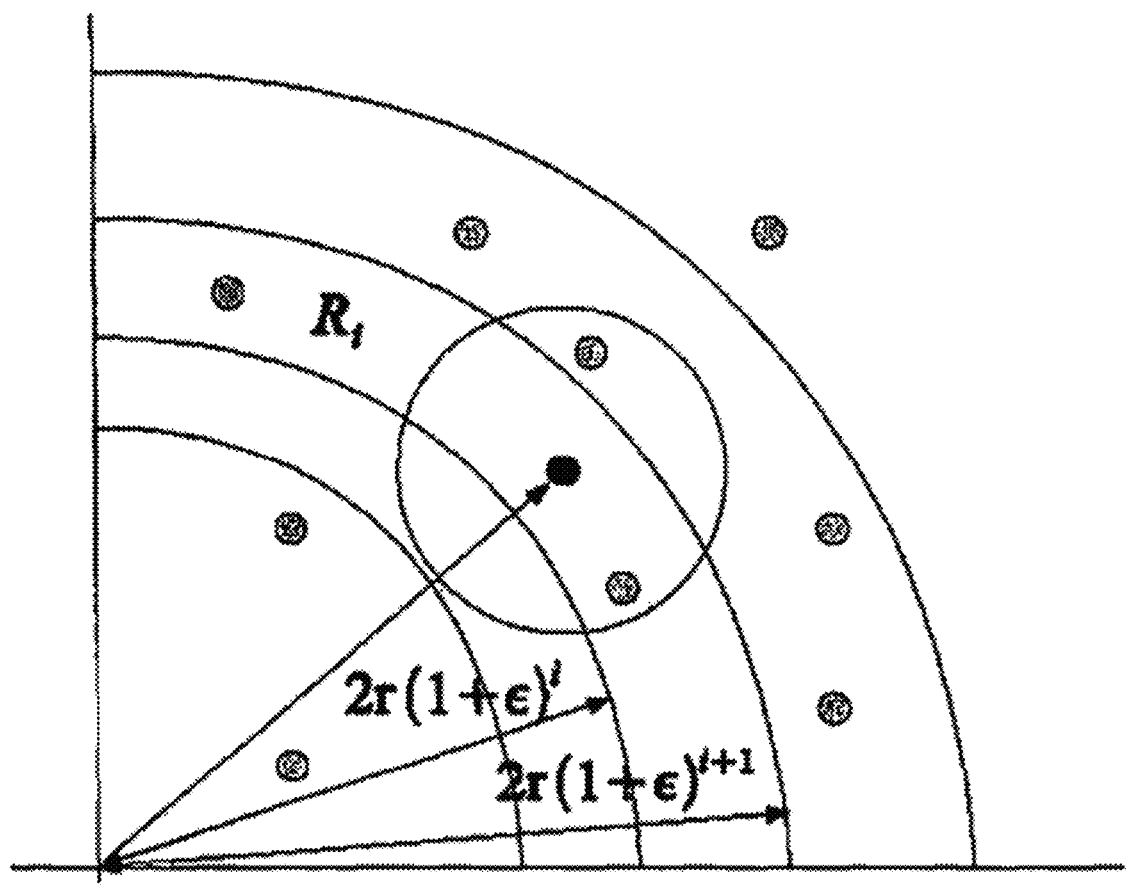
FIG. 14 is a chart illustrating a illustrating a combination of FIGS. 12 and 13, where a distance from query point 'x' and angle are applied to determine candidate 'suspects' for submission to the further matching system steps of path pursuit.

The previous sections only dealt with searching through vectors of the same length, namely r'. Now described is how one can use the construction as a building block to support a search in different radii. As seen in FIG. 14, the space is divided into rings of exponentially growing width. Ring i, denoted by $R_i$, includes all points $x_i$ such that ‖$x_i$‖∈[2r(1+∈)$^i$, 2r(1+∈)$^{i+1}$]. Doing this achieves two ends. First, if $x_i$ and $x_j$ belong to the same ring, then ‖$x_j$‖/(1+∈)≤‖$x_i$‖≤‖$x_j$‖(1+∈). Second, any search can be performed in at most 1/∈ such rings. Moreover, if the maximal length vector in the data set is r' then the total number of rings in the system is O(log (r'/r)).

Section 2 The Path Pursuit Problem

In the path pursuit problem, a fixed path in space is given along with the positions of a particle in a sequence of time points. The terms particle, cue, and point will be used interchangeably. The algorithm is required to output the position of the particle on the path. This is made harder by a few factors: The particle only follows the path approximately; the path can be discontinuous and intersect itself many times; both particle and path positions are given in a sequence of time points (different for each).

It is important to note that this problem can simulate tracking a particle on any number of paths. This is simply done by concatenating the paths into one long path and interpreting the resulting position as the position on the individual paths.

Figure 15:
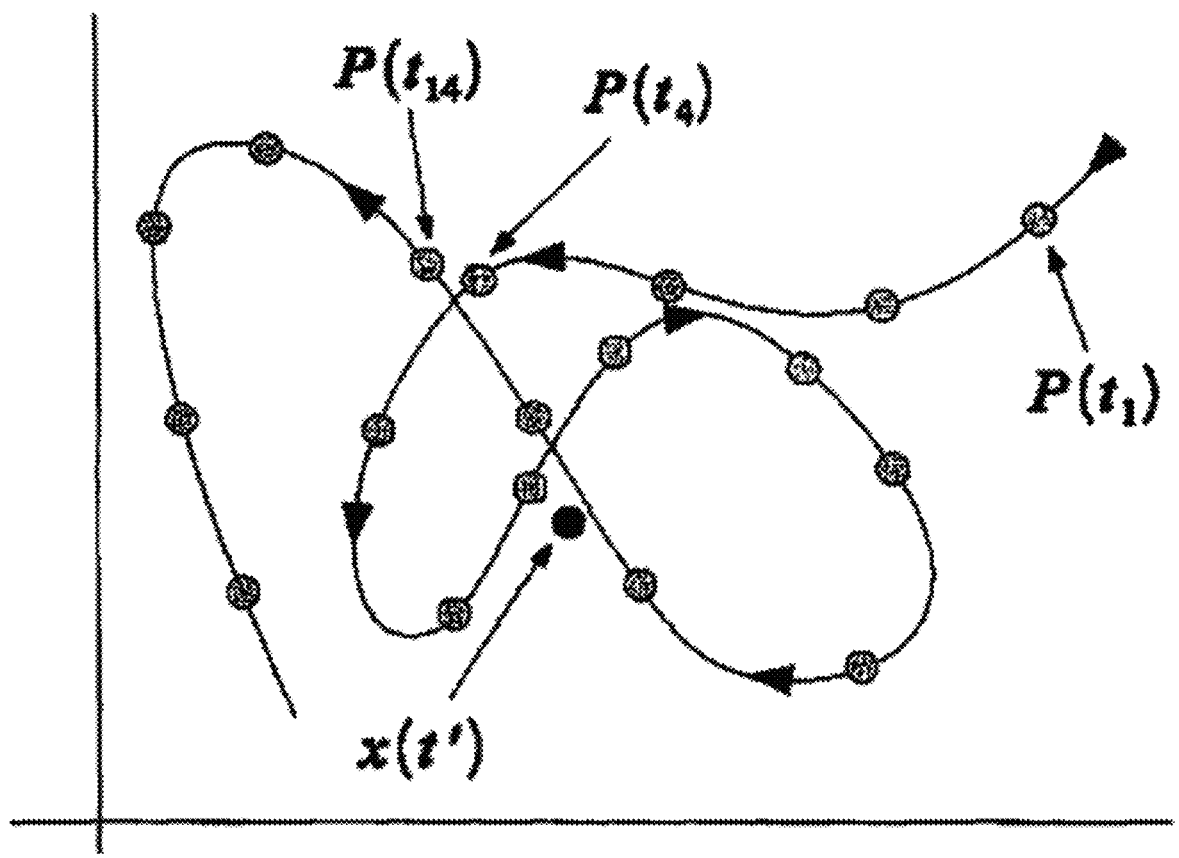
FIG. 15 is a chart illustrating self-intersecting paths and a query point.

More precisely, let path P be parametric curve P: $\mathbb{R} \to \mathbb{R}^d$. The curve parameter will be referred to as the time. The points on the path that are known to us are given in arbitrary time points $t_i$, i.e. n pairs ($t_i$, P($t_i$)) are given. The particle follows the path but its positions are given in different time points, as shown in FIG. 15. Further, m pairs (t'$_j$, x(t'$_j$)) are given, where x(t'$_j$) is the position of the particle in time t'$_j$.

Section 2.1 Likelihood Estimation

Since the particle does not follow the path exactly and since the path can intersect itself many times it is usually impossible to positively identify the position on the path the particle is actually on. Therefore, a probability distribution is computed on all possible path locations. If a location probability is significantly probable, the particle position is assumed to be known. The following section describes how this can be done efficiently.

If the particle is following the path, then the time difference between the particle time stamp and the offset of the corresponding points on P should be relatively fixed. In other words, if x(t') is currently in offset t on the path then it should be close to P(t). Also, r seconds ago it should have been in offset t−τ. Thus x(t'−τ) should be close to P(t−τ) (note that if the particle is intersecting the path, and x(t') is close to P(t) temporarily, it is unlikely that x(t'−τ) and P(t−τ) will also be close). Define the relative offset as Δ=t−t'. Notice that as long as the particle is following the path the relative offset Δ remains unchanged. Namely, x(t') is close to P(t'+Δ).

The maximum likelihood relative offset is obtained by calculating:

$$\Delta = \underset{\delta}{\operatorname{argmax}} Pr(x(t'_m), x(t'_{m-1}), \ldots, x(t'_1) \mid P, \delta)$$

In words, the most likely relative offset is the one for which the history of the particle is most likely. This equation however cannot be solved without a statistical model. This model must quantify: how tightly x follows the path; how likely it is that x jumps between locations; and how smooth the path and particle curves are between the measured points.

Section 2.2 Time Discounted Binning

Now described is a statistical model for estimating the likelihood function. The model makes the assumption that the particle's deviation away from the path distributes normally with standard deviation ar. It also assumes that at any given point in time, there is some non-zero probability the particle will abruptly switch to another path. This is manifested by an exponential discount with time for past points. Apart for being a reasonable choice for a modeling point of view this model also has the advantage of being efficiently updateable. For some constant time unit 1, set the likelihood function to be proportional to f which is defined as follows:

$$f_m(\lfloor \delta/\tau \rfloor) = \sum_{j=1}^{m} \sum_{i=1}^{n} e^{-\left(\frac{\|x(t'_j)-P(t_i+\delta)\|}{\sigma r}\right)^2} (1-\zeta)^{t'_i-t'_j}.$$

Here $\alpha \ll 1$ is a scale coefficient and is the probability that the particle will jump to a random location on the path in a given time unit.

Updating the function f efficiently can be achieved using the following simple observation.

$$f_m(\lfloor \delta/\tau \rfloor) = \sum_{i=1}^{n} e^{-\left(\frac{\|x(t'_m)-P(t_i+\delta)\|}{\sigma r}\right)^2} + f_{m-1}(\lfloor \delta/\tau \rfloor)(1-\zeta)^{t'_m-t'_{m-1}}$$

Moreover, since $\alpha \ll 1$, if $\|x(t'_m)-P(t_i)\| \geq r$, the follow occurs:

$$e^{-\left(\frac{\|x(t'_m)-P(t_i)\|}{\sigma r}\right)^2} \approx 0.$$

This is an important property of the likelihood function since the sum update can now performed only over the neighbors of $x(t'_1)$ and not the entire path. Denote by S the set of $(t_i, P(t_i))$ such that $\|x(t'_m)-P(t_i)\| \leq r$. The follow equation occurs:

$$f_m(\lfloor \delta/\tau \rfloor) = \sum_{(t_i, P(t_i)) \in S \wedge \lfloor (t'_m-t_i)/\tau \rfloor = \lfloor \delta/\tau \rfloor} e^{-\left(\frac{\|x(t'_m)-P(t_i)\|}{\sigma r}\right)^2} + f_{m-1}(\delta)(1-\zeta)^{t'_m-t'_{m-1}}$$

This is described in Algorithm 2.2 below. The term f is used as a sparse vector that receives also negative integer indices. The set S is the set of all neighbors of $x(t_i)$ on the path and can be computed quickly using the PPLEB algorithm. It is easy to verify that if the number of neighbors of $x(t_i)$ is bounded by some constant $n_{near}$ then the number of non-zeros in the vector f is bounded by $n_{near}/\zeta$ (which is only a constant factor larger. The final stage of the algorithm is to output a specific value of $\delta$ if $f(\lfloor \delta/\tau \rfloor)$ is above some threshold value.

---

Algorithm 2 Efficient likelihood update.

1:    $f \leftarrow 0$
2:    while $(t_j', x(t_j')) \in$ INPUT do
3:      $f \leftarrow (1-\zeta)^{t_j'-t_{j-1}'} f$
4:      $S \leftarrow \{(t_i, P(t_i)) \mid \|x(t_j') - P(t_i)\| \leq r\}$
5:      for $(t_i, P(t_i)) \in S$ do
6:        $\delta \leftarrow t_j' - t_i$
7:        $f(\lfloor \delta/\tau \rfloor) \leftarrow f(\lfloor \delta/\tau \rfloor) + e^{-\left(\frac{\|x(t_i)-P(t')\|}{\sigma \gamma}\right)^2}$
8:      end for
9:      Set all f values below threshold $\epsilon$ to zero.
10:    end while

---

Figure 11:
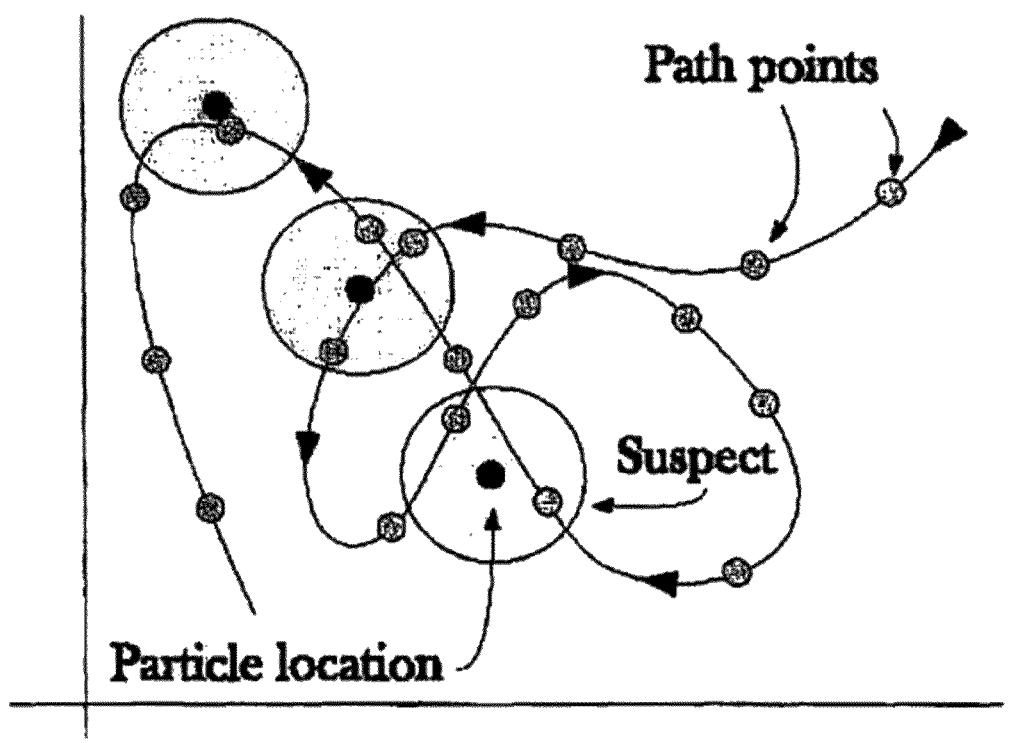
FIG. 11 is a chart illustrating point locations and the path points around them.

FIG. 11 gives three consecutive point locations and the path points around them. Note that neither the bottom point nor middle one alone would have been sufficient to identify the correct part of the path. Together, however, they are. Adding the top point increases the certainty that the particle is indeed of the final (left) curve of the path.

Figure 12:
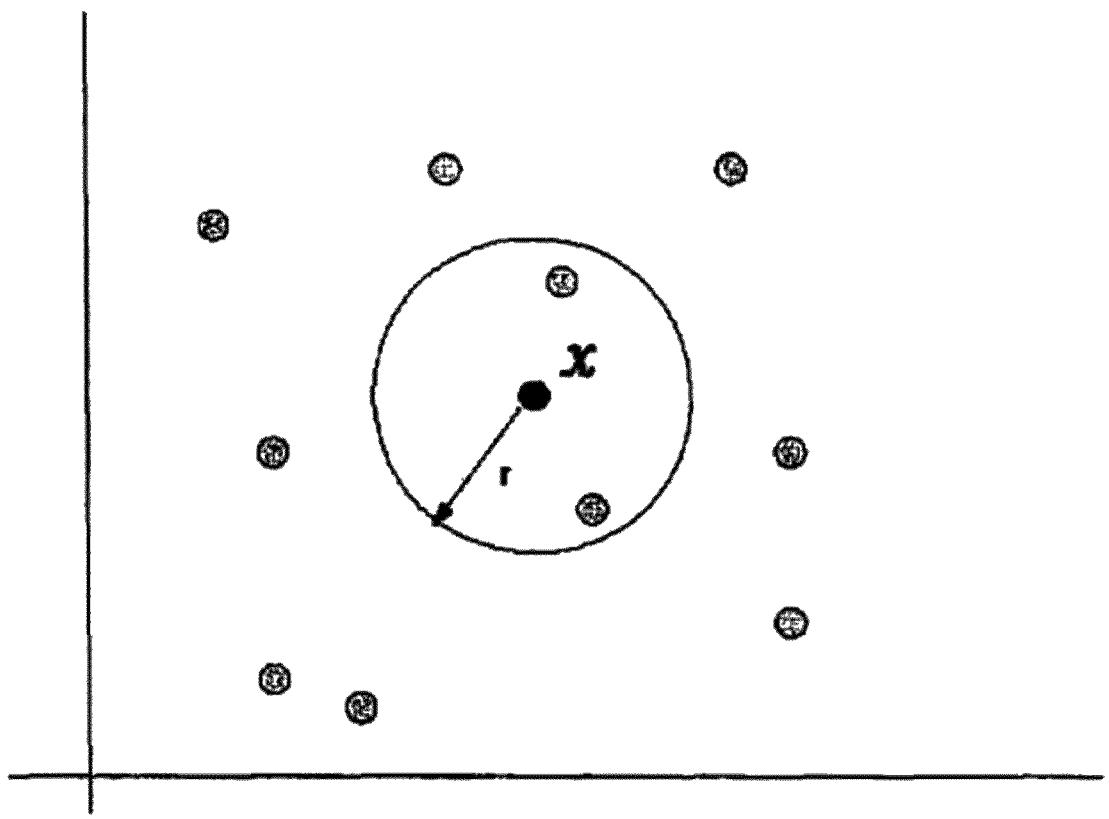
FIG. 12 is a chart illustrating a set of points that lie within radius 'r' distance from a query point 'x'.

In FIG. 12, given a set of n (grey) points, the algorithm is given a query point (black) and returns the set of points that lie within distance r from it (the points inside the circle). In the traditional setting, the algorithm must return all such points. In the probabilistic setting each such point should be returned only with some constant probability.

Figure 13:
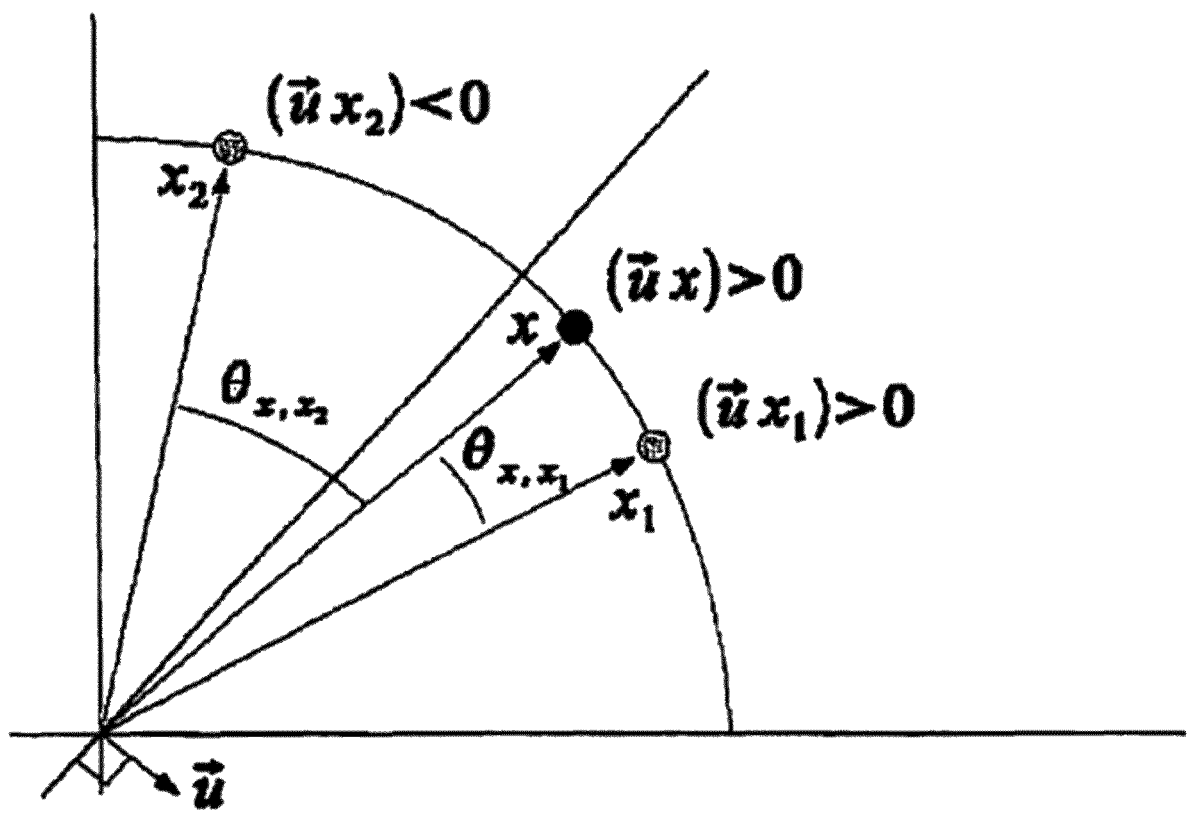
FIG. 13 is a chart illustrating possible point values where angles in 'n' dimension space are calculated as part of the candidate point qualification.

FIG. 13 illustrates the values of $u(x_1)$, $u(x_2)$, and $u(x)$. Intuitively, the function u gives different values to $x_1$ and $x_2$ if the dashed line passes between them and the same value otherwise. Passing the dashed line in a random direction ensures that the probability of this happening is directly proportional to angle between $x_1$ and $x_2$.

FIG. 15 shows that by dividing the space into rings such that ring $R_i$ is between radius $2r(1+\epsilon)^i$ and $2r(1+\epsilon)^{i+1}$, it can be made sure that any two vectors within a ring are the same length up to $(1+\epsilon)$ factors and that any search is performed in at most $1/\epsilon$ rings.

FIG. 15 shows a self-intersecting paths and a query point (in black). It illustrates that without the history of the particle positions it is impossible to know where it is on the path.

Figure 16:
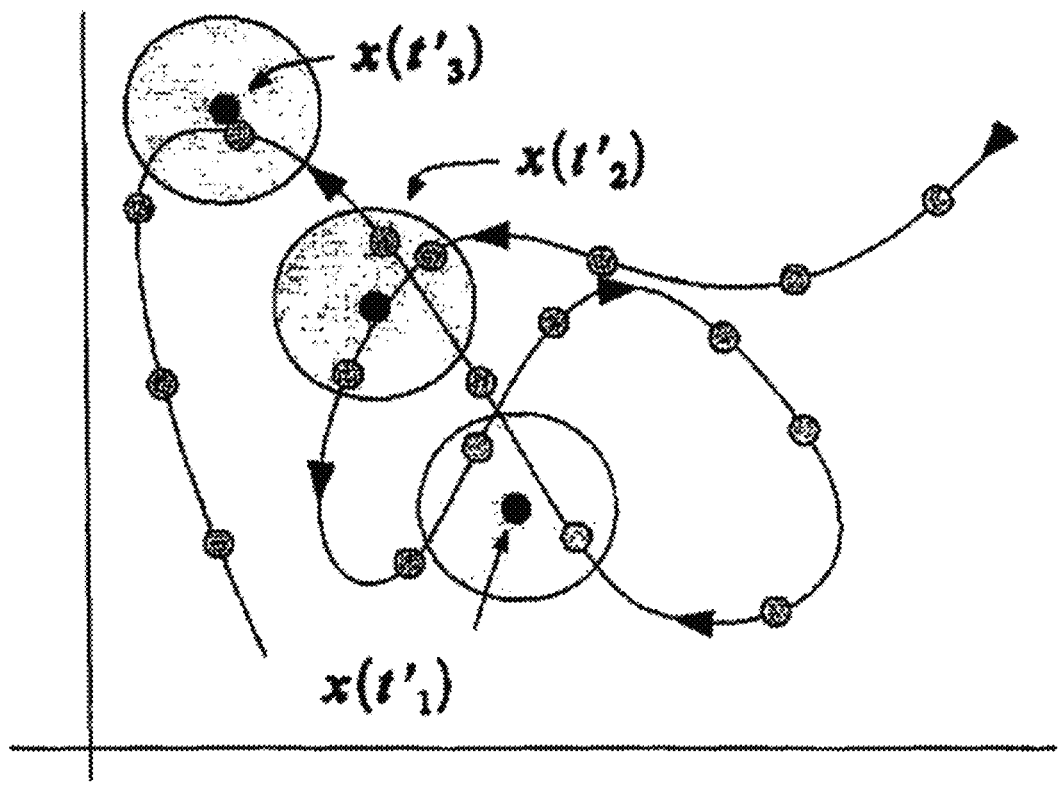
FIG. 16 is a chart illustrating three consecutive point locations and the path points around them.

FIG. 16 gives three consecutive point locations and the path points around them. Note that neither $x(t_1)$ nor $x(t_2)$ alone would have been sufficient to identify the correct part of the path. Together however they are. Adding $x(t_3)$ increases the certainty that the particle is indeed of the final (left) curve of the path.

In the preceding description, for the purposes of explanation, specific details are set forth in order to provide a thorough understanding of various examples. However, it will be apparent that various examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The figures and description are not intended to be restrictive.

The preceding description provides exemplary illustrations only, and is not intended to limit the scope, applicability, or configuration of the disclosure. Rather, the preceding description of the examples will provide those skilled in the art with an enabling description for implementing the various examples. It should be understood that various changes may be made in the function and arrangement of elements without departing from the spirit and scope of the invention as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, or other information may be passed, forwarded, or transmitted using any suitable means including memory sharing, message passing, token passing, network transmission, or other transmission technique.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

As described in further detail above, certain aspects and features of the present disclosure relate to identifying unknown data points by comparing the unknown data points to one or more reference data points. The systems and methods described herein improve the efficiency of storing and searching large datasets that are used to identify the unknown data points. For example, the systems and methods allow identification of the unknown data points while reducing the density of the large dataset required to perform the identification. The techniques can be applied to any system that harvests and manipulates large volumes of data. Illustrative examples of these systems include automated content-based searching systems (e.g., automated content recognition for video-related applications or other suitable application), MapReduce systems, Bigtable systems, pattern recognition systems, facial recognition systems, classification systems, computer vision systems, data compression systems, cluster analysis, or any other suitable system. One of ordinary skill in the art will appreciate that the techniques described herein can be applied to any other system that stores data that is compared to unknown data. In the context of automated content recognition (ACR), for example, the systems and methods reduce the amount of data that must be stored in order for a matching system to search and find relationships between unknown and known data groups.

By way of example only and without limitation, some examples described herein use an automated audio and/or video content recognition system for illustrative purposes. However, one of ordinary skill in the art will appreciate that the other systems can use the same techniques.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the various implementations are described with reference to specific examples thereof, but those skilled in the art will recognize that the implementations is not limited thereto. Various features and aspects of the above-described implementations may be used individually or jointly. Further, examples can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method of detecting a graphic, the method comprising:
    obtaining one or more video frames of a media segment, the media segment being displayed by a media device;
    detecting one or more image edges in a first video frame of the one or more video frames, wherein detecting the one or more image edges comprises:
        comparing a first portion of the video frame with a second portion of the video frame; and
        determining one or more differences between image data of the first portion of the video frame and image data of the second portion of the video frame;
    determining a duration of time that the one or more image edges remains within the one or more video frames; and
    detecting, based on determining that the duration of time is greater than a threshold duration, a particular type of image data included in the video frame.

2. The method of claim 1, wherein the particular type of image data is a graphic.

3. The method of claim 2, wherein the graphic includes a banner, a logo, or information related to a media program.

4. The method of claim 1, further comprising identifying, using at least the graphic, a media content stream being displayed, the media content stream including the media segment.

5. The method of claim 4, wherein the media content stream includes media content according to a schedule.

6. The method of claim 5, wherein the media content stream includes an unscheduled media segment.

7. The method of claim 6, wherein the graphic is superimposed onto the unscheduled media segment while the unscheduled media segment is being displayed.

8. The method of claim 1, further comprising generating one or more cues using the graphic, wherein the media segment is identified using the one or more cues.

9. The method of claim 1, wherein comparing a first portion of the video frame with a second portion of the video frame comprises:
determining one or more pixel patches from the first portion of the first video frame or second first portion of the first video frame, each pixel patch including a plurality of pixels;
for each of the one or more pixel patches, performing a discrete cosine transform for the pixel patch; and
for each discrete cosine transform for the one or more pixel patches, determining one or more coefficients associated with the discrete cosine transform,
wherein determining one or more differences between image data of the first portion of the video frame and image data of the second portion of the video frame comprises determining that an edge is present in the image data based at least on the one or more coefficients associated with the discrete cosine transform.

10. The method of claim 1, wherein comparing a first portion of the video frame with a second portion of the video frame comprises:
applying a Scharr filter, a Sobel filter, or a perceptual hashing algorithm to at least the first portion of the video frame.

11. The method of claim 1, wherein comparing a first portion of the video frame with a second portion of the video frame comprises:
determining one or more pixel patches from the first portion of the first video frame or second first portion of the first video frame, each pixel patch including a plurality of pixels; and
performing a convolution-coded stepwise sweep using at least one of the one or more pixel patches,
wherein determining one or more differences between image data of the first portion of the video frame and image data of the second portion of the video frame comprises determining that an edge is present in the image data based at least on a result of the convolution-coded stepwise sweep.

12. The method of claim 1, wherein comparing a first portion of the video frame with a second portion of the video frame comprises:
determining a pixel patch from the first portion of the first video frame or second first portion of the first video frame, the pixel patch including a plurality of pixels and including pixel information corresponding to at least a portion of the pixel patch;
reducing the pixel information of the pixel patch;
applying a Gaussian blur to the pixel patch;
determining a portion of the video frame; and
calculating a first-order differential of the pixel information in the pixel patch relative to a vertical or horizontal axis of the video frame,
wherein determining one or more differences between image data of the first portion of the video frame and image data of the second portion of the video frame comprises determining that an edge is present in the image data based at least on the first-order differential of the pixel information.

13. A computing device, comprising:
one or more processors; and
a non-transitory computer-readable medium including instructions that, when executed by the one or more processors, cause the one or more processors to perform operations including:
obtaining one or more video frames of a media segment, the media segment being displayed by a media device;
detecting one or more image edges in a first video frame of the one or more video frames, wherein detecting the one or more image edges comprises:
comparing a first portion of the first video frame with a second portion of the first video frame; and
determining one or more differences between image data of the first portion of the first video frame and image data of the second portion of the first video frame;
determining a duration of time that the one or more image edges remains within the video frame; and
detecting, based on determining that the duration of time is greater than a threshold duration, a particular type of image data included in the video frame.

14. The computing device of claim 13, wherein comparing a first portion of the video frame with a second portion of the video frame comprises:
determining one or more pixel patches from the first portion of the first video frame or second first portion of the first video frame, each pixel patch including a plurality of pixels;
for each of the one or more pixel patches, performing a discrete cosine transform for the pixel patch;
for each discrete cosine transform for the one or more pixel patches, determining one or more coefficients associated with the discrete cosine transform,
wherein determining one or more differences between image data of the first portion of the video frame and image data of the second portion of the video frame comprises determining that an edge is present in the image data based at least on the one or more coefficients associated with the discrete cosine transform.

15. The computing device of claim 13, wherein comparing a first portion of the video frame with a second portion of the video frame comprises:
applying a Scharr filter, a Sobel filter, or a perceptual hashing algorithm to at least the first portion of the video frame.

16. The computing device of claim 13, wherein detecting one or more image edges in the video frame further comprises:
determining one or more pixel patches from the first portion of the first video frame or second first portion of the first video frame, each pixel patch including a plurality of pixels; and
performing a convolution-coded stepwise sweep using at least one of the one or more pixel patches,
wherein determining one or more differences between image data of the first portion of the video frame and image data of the second portion of the video frame comprises determining that an edge is present in the image data based at least on a result of the convolution-coded stepwise sweep.

17. The computing device of claim 13, wherein comparing a first portion of the video frame with a second portion of the video frame comprises:

determining a pixel patch from the first portion of the first video frame or second first portion of the first video frame, the pixel patch including a plurality of pixels and including pixel information corresponding to at least a portion of the pixel patch;

reducing the pixel information of the pixel patch;

applying a Gaussian blur to the pixel patch;

determining a portion of the video frame; and calculating a first-order differential of the pixel information in the pixel patch relative to a vertical or horizontal axis of the video frame, wherein determining one or more differences between image data of the first portion of the video frame and image data of the second portion of the video frame comprises determining that an edge is present in the image data based at least on the first-order differential of the pixel information.

18. A computer-program product tangibly embodied in a non-transitory machine-readable storage medium, including instructions that, when executed by one or more processors, cause the one or more processors to:

obtaining a video frame of a media segment, the media segment being displayed by a media device;

detecting one or more image edges in a first video frame of the one or more video frames, wherein detecting the one or more image edges comprises:

comparing a first portion of the first video frame with a second portion of the first video frame; and determining one or more differences between image data of the first portion of the first video frame and image data of the second portion of the first video frame;

determining a duration of time that the one or more image edges remains within the video frame; and detecting, based on determining that the duration of time is greater than a threshold duration, a particular type of image data included in the video frame.

19. The computer-program product of claim 18, wherein comparing a first portion of the video frame with a second portion of the video frame comprises:

determining one or more pixel patches from the first portion of the first video frame or second first portion of the first video frame, each pixel patch including a plurality of pixels;

for each of the one or more pixel patches, performing a discrete cosine transform for the pixel patch; and for each discrete cosine transform for the one or more pixel patches, determining one or more coefficients associated with the discrete cosine transform, wherein determining one or more differences between image data of the first portion of the video frame and image data of the second portion of the video frame comprises determining that an edge is present in the image data based at least on the one or more coefficients associated with the discrete cosine transform.

20. The computer-program product of claim 18, wherein comparing a first portion of the video frame with a second portion of the video frame comprises:

applying a Scharr filter, a Sobel filter, or a perceptual hashing algorithm to at least the first portion of the video frame.

* * * * *